(12) United States Patent
Horn et al.

(10) Patent No.: US 12,244,360 B2
(45) Date of Patent: Mar. 4, 2025

(54) RELAY CHARACTERISTIC REPORTING AND CONTROL

(71) Applicant: QUALCOMM Incorporated, San Diego, CA (US)

(72) Inventors: Idan Michael Horn, Hod Hasharon (IL); Assaf Touboul, Netanya (IL); Gideon Shlomo Kutz, Ramat Hasharon (IL); Shay Landis, Hod Hasharon (IL); Amit Bar-Or Tillinger, Tel-Aviv (IL); Shai Spiegelblat, Raanana (IL)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 17/651,557

(22) Filed: Feb. 17, 2022

(65) Prior Publication Data

US 2023/0261772 A1 Aug. 17, 2023

(51) Int. Cl.
*H04B 17/364* (2015.01)
*H04W 24/10* (2009.01)
*H04W 56/00* (2009.01)

(52) U.S. Cl.
CPC .......... *H04B 17/364* (2015.01); *H04W 24/10* (2013.01); *H04W 56/004* (2013.01)

(58) Field of Classification Search
CPC .. H04B 17/364; H04W 24/10; H04W 56/004; H04W 84/12
See application file for complete search history.

(56) References Cited

U.S. PATENT DOCUMENTS

| | | | |
|---|---|---|---|
| 10,050,891 B1* | 8/2018 | Parihar | H04W 16/32 |
| 2007/0091863 A1* | 4/2007 | Sampath | H04W 72/543 370/252 |
| 2007/0217432 A1* | 9/2007 | Molisch | H04W 52/46 370/400 |
| 2008/0112497 A1* | 5/2008 | Shan | H04L 27/2662 375/260 |
| 2008/0114472 A1* | 5/2008 | Lee | G05B 11/42 700/37 |
| 2014/0126467 A1* | 5/2014 | Lu | H04L 1/009 370/328 |
| 2014/0350634 A1* | 11/2014 | Grill | A61N 1/36082 607/45 |
| 2017/0013653 A1* | 1/2017 | Suzuki | H04W 8/005 |
| 2017/0195823 A1* | 7/2017 | Shinohara | H04W 4/70 |
| 2019/0239147 A1* | 8/2019 | Chun | H04W 88/06 |
| 2019/0274017 A1* | 9/2019 | Wang | H04L 12/1854 |
| 2020/0133226 A1* | 4/2020 | Tsuneki | G06N 20/00 |
| 2021/0392054 A1* | 12/2021 | David | G06K 7/10297 |
| 2022/0191254 A1* | 6/2022 | Parasseeri | H04L 67/02 |
| 2022/0312535 A1* | 9/2022 | Wu | H04W 48/12 |

(Continued)

*Primary Examiner* — Christine Ng
(74) *Attorney, Agent, or Firm* — Patterson + Sheridan, L.L.P./Qualcomm

(57) ABSTRACT

Certain aspects of the present disclosure provide techniques for wireless communication by a user equipment, including in one example: receiving a relay characteristic report, wherein the relay characteristic report indicates an intrinsic channel delay of a relay device; determining a channel delay spread of the channel; and transmitting an indication to affect relay device operation based at least in part on the channel delay spread and the intrinsic channel delay of the relay device.

15 Claims, 14 Drawing Sheets

(56) References Cited

U.S. PATENT DOCUMENTS

| | | | |
|---|---|---|---|
| 2023/0189050 A1* | 6/2023 | Rao | H04L 47/283 |
| | | | 370/231 |
| 2023/0309161 A1* | 9/2023 | Rao | H04L 5/0048 |
| 2024/0014889 A1* | 1/2024 | Fujii | H04B 7/18504 |

* cited by examiner

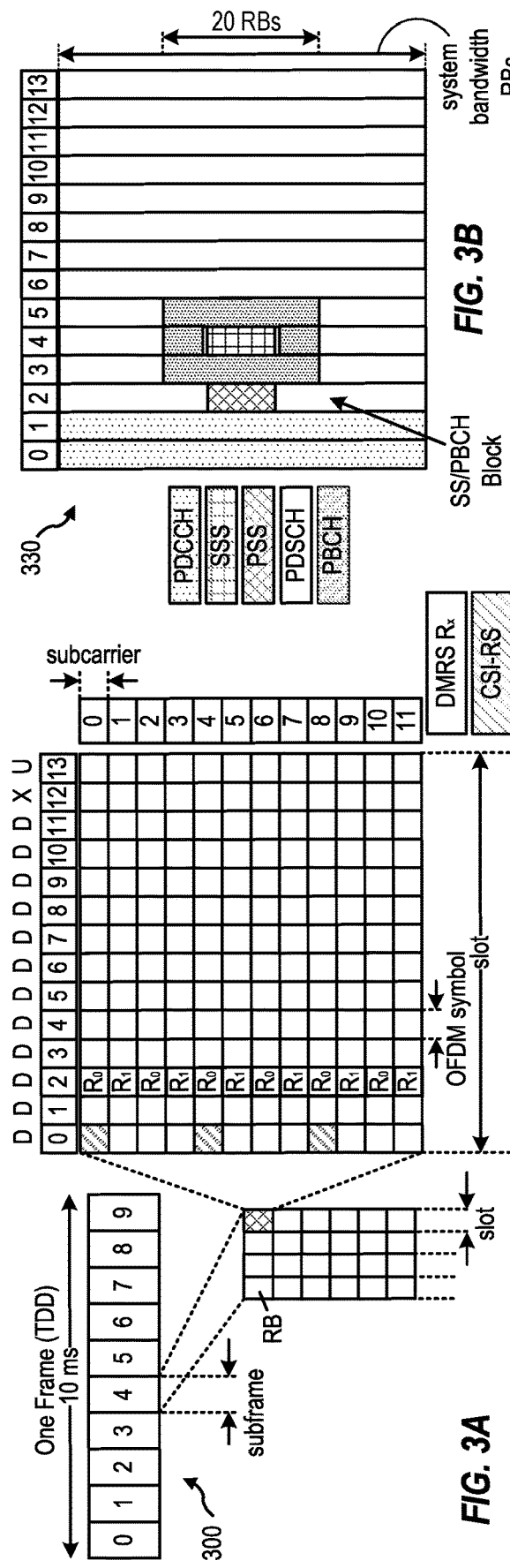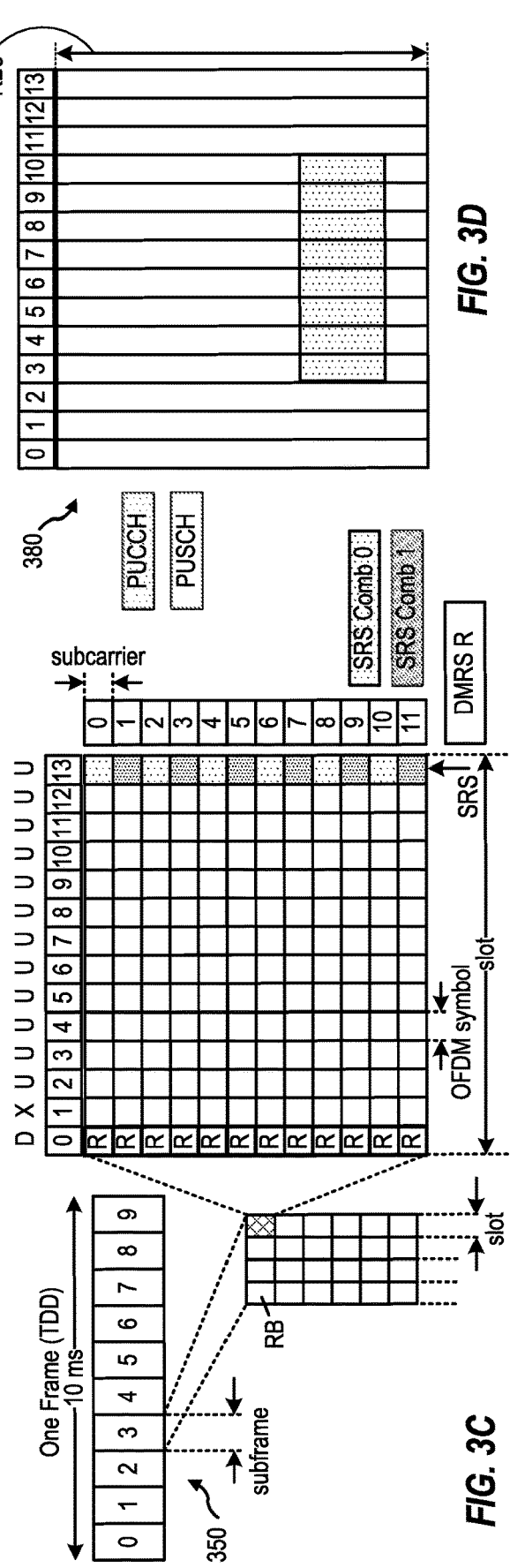

RELAY CHARACTERISTIC REPORTING AND CONTROL

BACKGROUND

Field of the Disclosure

Aspects of the present disclosure relate to wireless communications, and more particularly, to techniques for reporting relay characteristics in order to control the function of relays in a wireless communication network.

Description of Related Art

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available wireless communication system resources with those users Although wireless communication systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communication systems, increasing the ability for different types of devices to intercommunicate, increasing the number and type of wireless communication mediums available for use, and the like. Consequently, there exists a need for further improvements in wireless communications systems to overcome the aforementioned technical challenges and others.

SUMMARY

One aspect provides a method for wireless communication by a network entity, comprising: receiving, from a relay device, a capability indication indicating that the relay device is configured to relay a signal with latency below a threshold latency; receiving, from the relay device, a relay characteristic report; transmitting, to a user equipment, the relay characteristic report; receiving, from the user equipment, a request to affect relay device operation; and transmitting, to the relay device, an instruction based at least in part on the request to affect relay device operation.

Another aspect provides a method for wireless communication by a user equipment, comprising: receiving, from a network entity on a channel, a relay characteristic report, wherein the relay characteristic report indicates an intrinsic channel delay of a relay device; determining a channel delay spread of the channel; and transmitting, to the network entity, a request to affect relay device operation based at least in part on the channel delay spread and the intrinsic channel delay of the relay device.

Another aspect provides a method for wireless communication by a relay device, comprising: transmitting, to a network entity, a capability indication indicating that the relay device is configured to relay a signal with latency below a threshold latency; transmitting, to the network entity, a relay characteristic report; and receiving, from the network entity, an instruction configured to affect operation of the relay device.

Another aspect provides a method for wireless communication by a user equipment, comprising: receiving, from a relay device, a capability indication indicating that the relay device is configured to relay a signal on a channel with latency below a threshold latency; receiving, from the relay device, a relay characteristic report, wherein the relay characteristic report indicates an intrinsic channel delay of the relay device; determining a channel delay spread of the channel; and transmitting, to the relay device, an instruction based at least in part on the determined channel delay spread of the channel and the intrinsic channel delay of the relay device.

Another aspect provides a method for wireless communication by a relay device, comprising: transmitting, to a user equipment, a capability indication indicating that the relay device is configured to relay a signal on a channel with latency below a threshold latency; transmitting, to the user equipment, a relay characteristic report; and receiving, from the user equipment, an instruction configured to affect operation of the relay device.

Another aspect provides a method for wireless communication by a user equipment, comprising: receiving a relay characteristic report, wherein the relay characteristic report indicates an intrinsic channel delay of a relay device; determining a channel delay spread of the channel; and transmitting an indication to affect relay device operation based at least in part on the channel delay spread and the intrinsic channel delay of the relay device.

Another aspect provides a method for wireless communication by a relay device, comprising: transmitting a capability indication indicating that the relay device is configured to relay a signal with latency below a threshold latency; transmitting a relay characteristic report; and receiving an instruction configured to affect operation of the relay device.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 3A, 3B, 3C, and 3D depict various example aspects of data structures for a wireless communication network.

DETAILED DESCRIPTION

Figure 1:
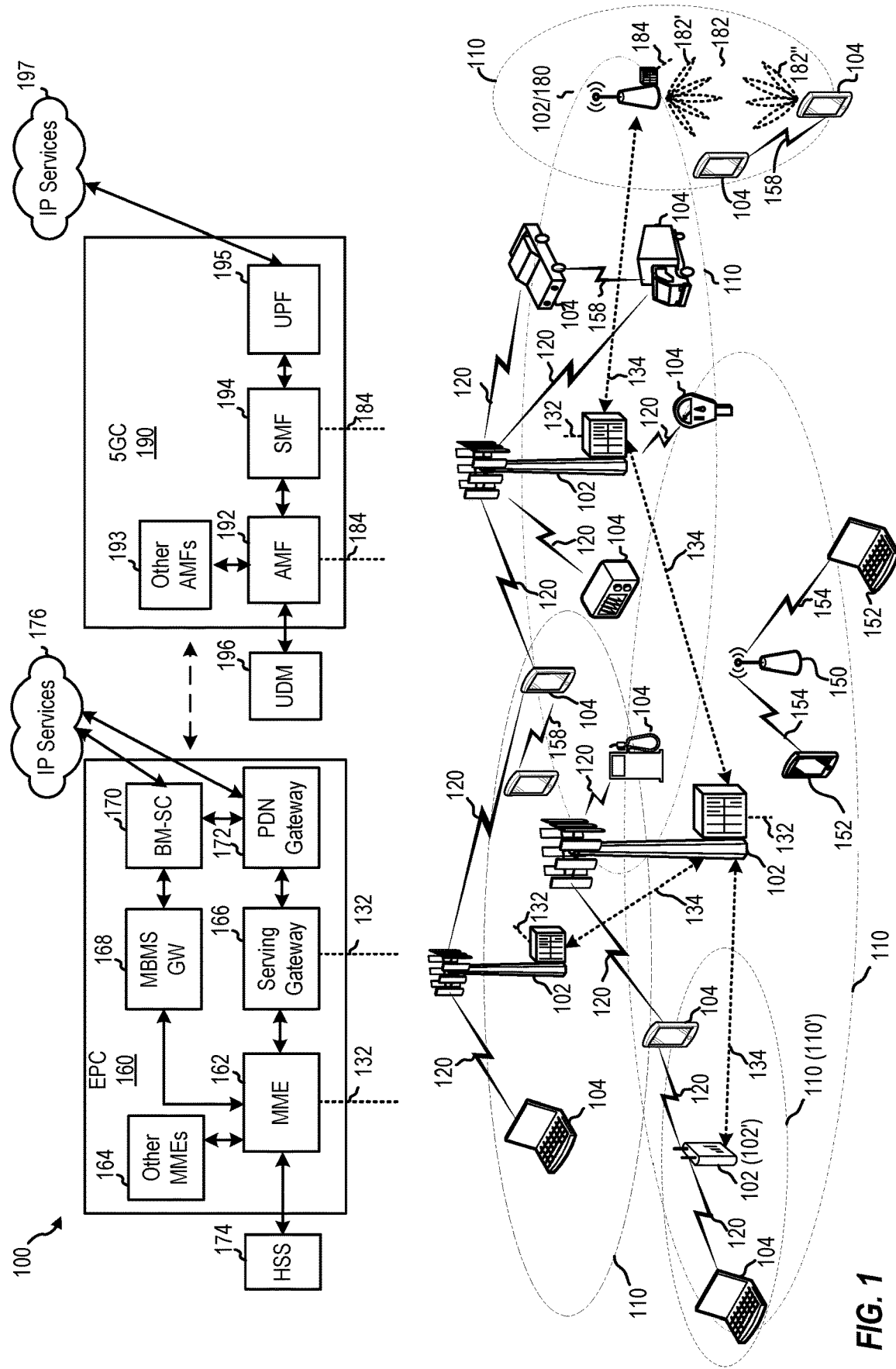
FIG. 1 is a block diagram conceptually illustrating an example wireless communication network.

Aspects of the present disclosure provide apparatuses, methods, processing systems, and computer-readable mediums for reporting relay characteristics in order to control the function of relays in a wireless communication network.

Emerging wireless communications technologies increasingly rely on high-frequency carriers to enable high-speed services. Because of the natural wave propagation and attenuation characteristics of such high-frequency carriers, line of sight communication channels are increasingly important for ensuring coverage and throughputs performance. However, in urban and indoor contexts, line of sight communication channels may be hard to find and maintain. Accordingly, wireless communication networks may rely on additional signal relaying devices, such as relays, repeaters, femto-cells, reconfigurable intelligent surfaces (RISs), and mobile devices (generally, relay devices), to bypass physical signal impediments.

While repeater devices may resolve the line of sight challenge, such devices should not introduce significant latency into the receiving and/or transmitting chain. For example, use of a repeater between a base station and a user equipment should not cause the user equipment's channel delay spread to enlarge beyond a cyclic prefix length, which could cause inter-symbol interference (ISI) at the user equipment and actually harm, rather than help, the communication link.

Relatedly, user equipments may implement various internal algorithms that rely on some portion of the cyclic prefix in order to improve performance, such as a weighted overlap and add (WOLA) algorithm, a back off algorithm, an undroop algorithm, and others, which rely on accurate determination of the channel delay spread. Operation of a repeater that is transparent to a user equipment may change the channel delay spread assumptions of the user equipment and undermine the user equipment's use of such internal algorithms.

To overcome these technical challenges, which are necessarily rooted in communications system technology, aspects described herein relate to reporting of an intrinsic channel delay of the repeater that will enable a user equipment to transmit a request to affect operations of the repeater based on both a channel deal spread determined by the user equipment and the intrinsic channel delay of the repeater. In this way, the circumstances in which use of a repeater actually harm the communication link may be more accurately identified and corrected by affecting operations of the repeater. For example, based on receiving a repeater characteristic report, which may include information such as inherent delay and amplitude characteristics of the repeater, the user equipment may cause the repeater to enable or disable operation. Further, the user equipment may update internal algorithms of the user equipment (e.g., that rely on channel delay spread) based on the characteristic report to further improve performance.

In various aspects described herein, a user equipment may coordinate with a network entity, such as a base station, to receive repeater characteristic reporting and to affect repeater operations, or the user equipment may coordinate directly with a repeater, such as using sidelink communication channels.

Accordingly, aspects described herein enable improved performance between devices in a communication network. For example, a user equipment may improve channel conditions by selectively enabling or disabling a repeater intervening in communications between the user equipment and another network entity based on receiving a repeater characteristic report. Generally, improving channel conditions may beneficially enable better signal coverage, higher data throughput, fewer retransmissions, improved spectrum efficiency, and lower communications latency, to name just a few benefits. These benefits extend to both the user equipment and the network in which the user equipment is communicating. Additionally, or alternatively, the performance of the user equipment may be further improved by setting internal operating parameters (e.g., related to internal algorithms) based on accurate knowledge of channel characteristics with and without repeater operation, such as the channel delay spread with and without repeater operation. Such adaptation was not previously possible when repeater operation was transparent to the user equipment. Therefore, aspects described herein enable new and useful capabilities to improve wireless communication performance.

Introduction to Wireless Communication Networks

The techniques and methods described herein may be used for various wireless communications networks. While aspects may be described herein using terminology commonly associated with 3G, 4G, and/or 5G wireless technologies, aspects of the present disclosure may likewise be applicable to other communication systems and standards not explicitly mentioned herein.

FIG. 1 depicts an example of a wireless communication network 100, in which aspects described herein may be implemented.

Generally, wireless communication network 100 includes various network entities (alternatively, network elements or network nodes), which are generally logical entities associated with, for example, a communication device and/or a communication function associated with a communication device. For example, various functions of a network as well as various devices associated with and interacting with a network may be considered network entities.

In the depicted example, wireless communication network 100 includes base stations (BSs) 102, user equipments (UEs) 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with UEs 104 via communications links 120. The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

FIG. 1 depicts various example BSs 102, which may more generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and others. Each of BSs 102 may provide communication coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communication coverage for a macro cell (covering relatively large geographic area), a pico cell (covering relatively smaller geographic area, such as a sports stadium), a femto cell (relatively smaller geographic area (e.g., a home)), and/or other types of cells.

While BSs 102 are depicted in various aspects as unitary communication devices, BSs 102 may be implemented in various configurations. For example, one or more components of base station may be disaggregated, including a central unit (CU), one or more distributed units (DUs), one or more radio units (RUs), a radio unit (RU), a Near-Real Time (Near-RT) RAN Intelligent Controller (RIC), or a Non-Real Time (Non-RT) MC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture.

Different BSs 102 within wireless communication network 100 may also be configured to support different radio access technologies, such as 3G, 4G, and 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communication network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHz-6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communication links 120 between BSs 102 and, for example, UEs 104, may be through one or more carriers, which may have different bandwidths (e.g., 5, 10, 15, 20, 100, 400, and other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming. In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 further includes a Wi-Fi AP 150 in communication with Wi-Fi stations (STAs) 152 via communication links 154 in, for example, a 2.4 GHz and/or 5 GHz unlicensed frequency spectrum.

Certain UEs 104 may communicate with each other using device-to-device (D2D) communication link 158. D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172 in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, an integrated access and backhaul (IAB) node, a relay node, a sidelink node, to name a few examples.

Figure 2:
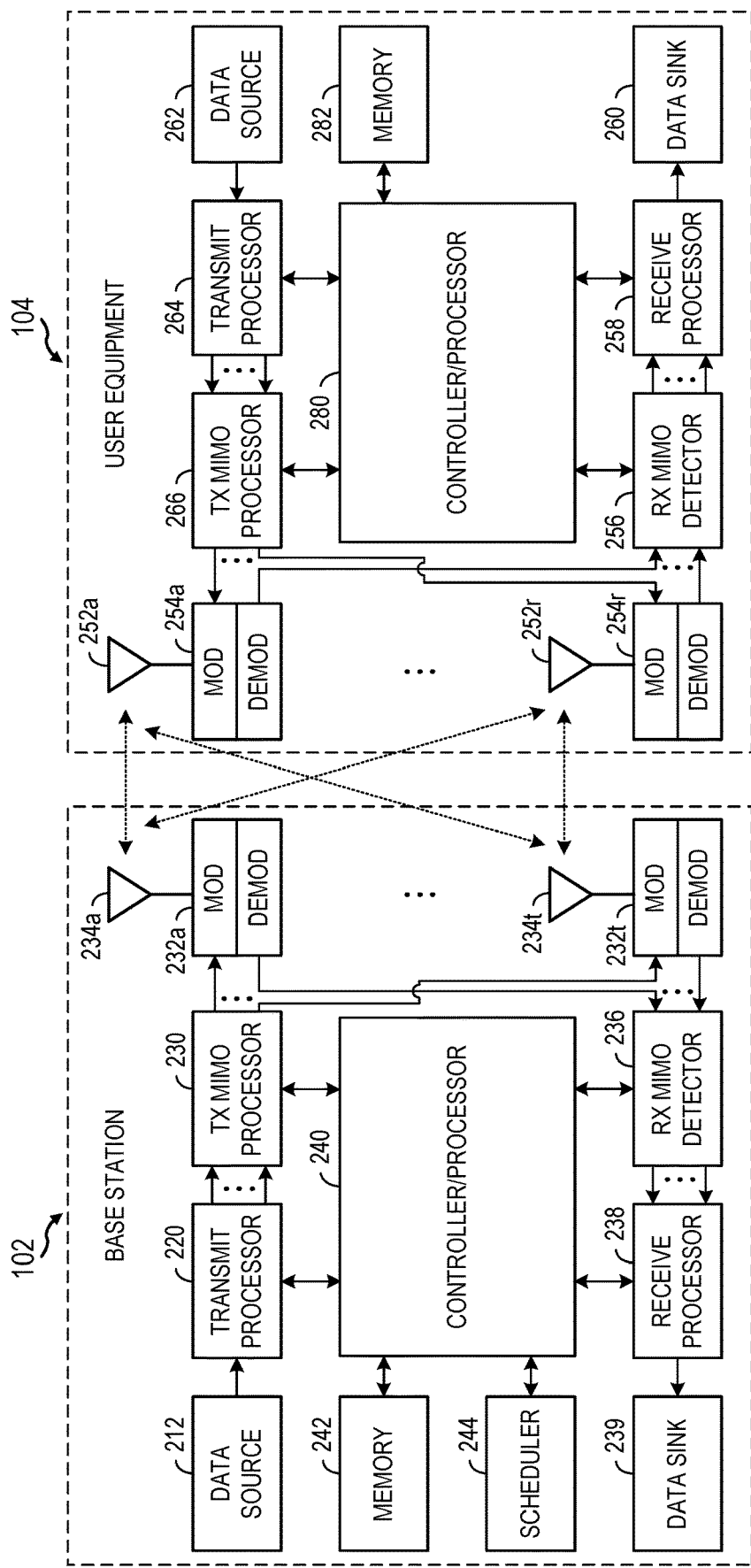
FIG. 2 is a block diagram conceptually illustrating aspects of an example base station and an example user equipment.

FIG. 2 depicts aspects of an example BS 102 and a UE 104.

Generally, BS 102 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, BS 102 may send and receive data between BS 102 and UE 104. BS 102 includes controller/processor 240, which may be configured to implement various functions described herein related to wireless communications.

Generally, UE 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., data source 262) and wireless reception of data (e.g., data sink 260). UE 104 includes controller/processor 280, which may be configured to implement various functions described herein related to wireless communications.

In regards to an example downlink transmission, BS 102 includes a transmit processor 220 that may receive data from a data source 212 and control information from a controller/processor 240. The control information may be for the physical broadcast channel (PBCH), physical control format indicator channel (PCFICH), physical HARQ indicator channel (PHICH), physical downlink control channel (PDCCH), group common PDCCH (GC PDCCH), and others. The data may be for the physical downlink shared channel (PDSCH), in some examples.

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator in transceivers 232*a*-232*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 232*a*-232*t* may be transmitted via the antennas 234*a*-234*t*, respectively.

In order to receive the downlink transmission, UE 104 includes antennas 252*a*-252*r* that may receive the downlink signals from the BS 102 and may provide received signals to the demodulators (DEMODs) in transceivers 254*a*-254*r*, respectively. Each demodulator in transceivers 254*a*-254*r* may condition (e.g., filter, amplify, downconvert, and digitize) a respective received signal to obtain input samples. Each demodulator may further process the input samples to obtain received symbols.

MIMO detector 256 may obtain received symbols from all the demodulators in transceivers 254*a*-254*r*, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

In regards to an example uplink transmission, UE 104 further includes a transmit processor 264 that may receive and process data (e.g., for the PUSCH) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 212, scheduler 244, memory 242, transmit processor 220, controller/processor 240, TX MIMO processor 230, transceivers 232a-t, antenna 234a-t, and/or other aspects described herein. Similarly, "receiving" may refer to various mechanisms of obtaining data, such as obtaining data from antennas 234a-t, transceivers 232a-t, RX MIMO detector 236, controller/processor 240, receive processor 238, scheduler 244, memory 242, and other aspects described herein.

In various aspects, UE 104 may likewise be described as transmitting and receiving various types of data associated with the methods described herein. In these contexts, "transmitting" may refer to various mechanisms of outputting data, such as outputting data from data source 262, memory 282, transmit processor 264, controller/processor 280, TX MIMO processor 266, transceivers 254a-t, antenna 252a-t, and/or other aspects described herein. Similarly, "receiving" may refer to various mechanisms of obtaining data, such as obtaining data from antennas 252a-t, transceivers 254a-t, RX MIMO detector 256, controller/processor 280, receive processor 258, memory 282, and other aspects described herein.

In some aspects, a processor may be configured to perform various operations, such as those associated with the methods described herein, and transmit (output) to or receive (obtain) data from another interface that is configured to transmit or receive, respectively, the data.

FIGS. 3A, 3B, 3C, and 3D depict aspects of data structures for a wireless communication network, such as wireless communication network 100 of FIG. 1.

In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Wireless communication systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 3B and 3D) into multiple orthogonal subcarriers. Each subcarrier may be modulated with data. Modulation symbols may be sent in the frequency domain with OFDM and in the time domain with SC-FDM.

A wireless communication frame structure may be frequency division duplex (FDD), in which for a particular set of subcarriers and subframes within the set of subcarriers are dedicated for either DL or UL. Wireless communication frame structures may also be time division duplex (TDD), in which for a particular set of subcarriers and subframes within the set of subcarriers are dedicated for both DL and UL.

In FIG. 3A and 3C, the wireless communication frame structure is TDD where D is DL, U is UL, and X is flexible for use between DL/UL. UEs may be configured with the slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot configuration. Subframes may also include mini-slots, which generally have fewer symbols than an entire slot. Other wireless communication technologies may have a different frame structure and/or different channels.

Generally, the number of slots within a subframe is based on a slot configuration and a numerology. For slot configuration 0, different numerologies($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A, 3B, 3C, and 3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 3A, 3B, 3C, and 3D, a resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DMRS) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may also transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Repeater Characteristic Reporting and Control

Figure 4A:
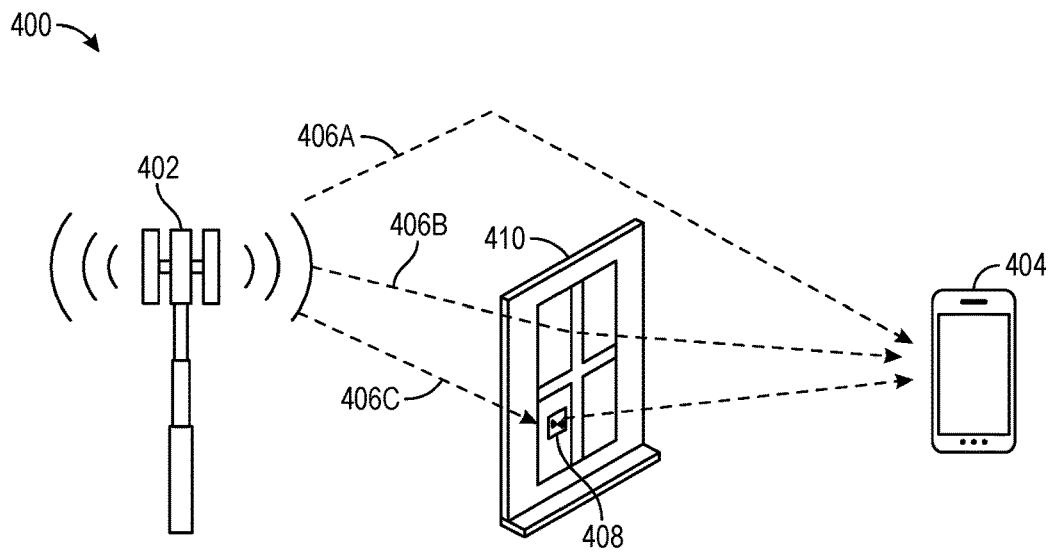
FIGS. 4A and 4B depict example scenarios in which a relay may be used in a wireless communication network.
Figure 4B:
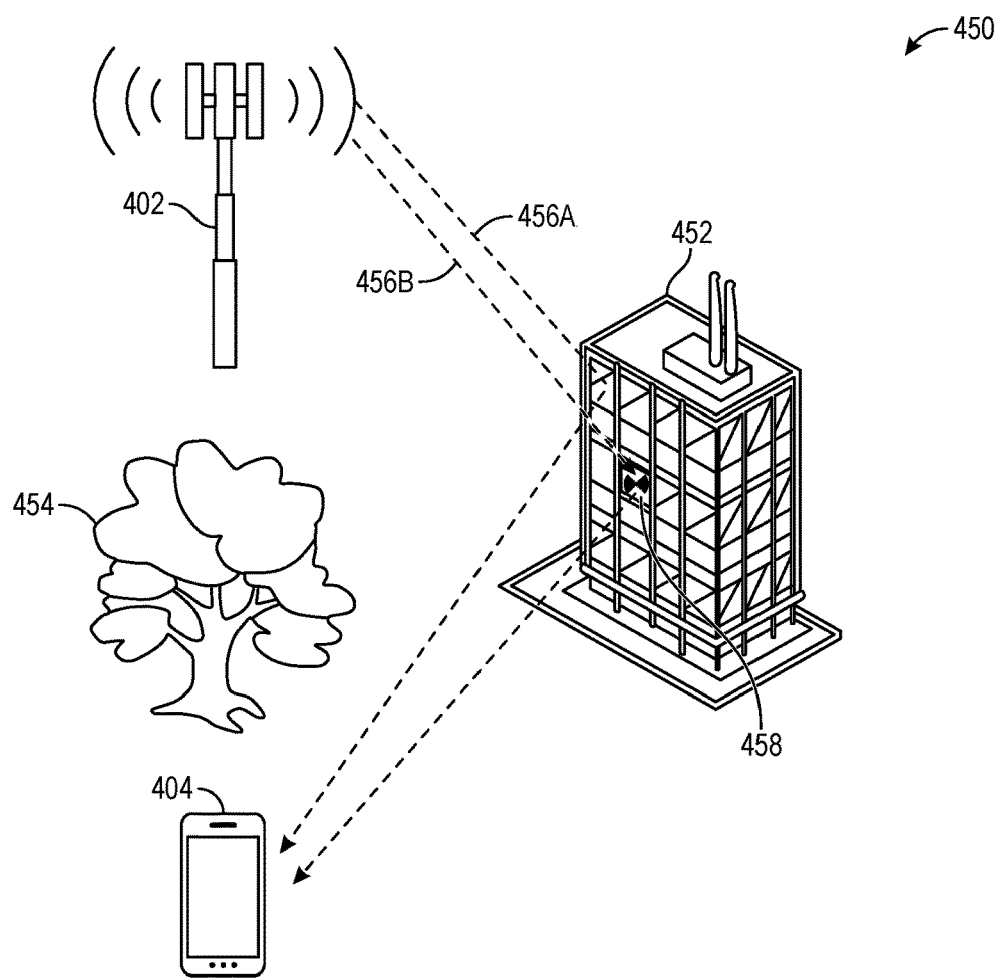

FIGS. 4A and 4B depict two example scenarios, 400 and 450 respectively, in which a repeater may be used in a wireless communication network.

In FIG. 4A, which depicts an outdoor to indoor signal propagation scenario 400, a wireless transmitter 402 (e.g., a base station or radio unit associated with a base station) is transmitting data over a wireless channel to a receiver 404 (e.g., a user equipment) via multipath wireless channel elements 406A-406C. In this particular example, wireless multipath element 406A reflects off an unseen object in transit to receiver 404, wireless multipath element 406B goes through window 410 in transit to receiver 404, and wireless multipath element 406C is received by repeater 408 and then retransmitted to receiver 404.

Assuming for this example that transmitter 402, receiver 404, and window 410 are stationary, and thus attenuations and propagation delays do not vary with time, then the impulse response of the received signal at receiver 404 for the multipath channel without the repeater 408 is:

$$h(\tau)=\Sigma_i \alpha_i \delta(\tau-\tau_i) \tag{1}$$

where $\alpha_i$ is the attenuation along path i and $\tau_i$ is the propagation delay along path i. Both max delay and delay spread can be extracted from $h(\tau)$. The difference between max delay and delay spread is that max delay is the delay from a first tap (or cluster) to a last one, whereas "delay spread" takes all clusters inside $h(\tau)$ into account to determine a channel center of mass. More specifically, delay spread may be calculated according to:

$$\sigma_\tau=\sqrt{\overline{\tau^2}-\overline{\tau}^2} \tag{2}$$

where $\sigma$ is the root mean square (RMS) delay spread, and $$\overline{\tau^2} = \frac{\sum_{i=0}^{K-1}|a_i|^2 \tau_i^2}{\sum_{i=0}^{K-1}|a_i|^2} \tag{3}$$

$$\overline{\tau} = \frac{\sum_{i=0}^{K-1}|a_i|^2 \tau_i}{\sum_{i=0}^{K-1}|a_i|^2} \tag{4}$$

where $\alpha_i$ is the amplitude of each cluster i and $\tau_i$ is the delay of each cluster i.

Max delay can be calculated as:

$$\tau_{max}=\max(\tau)-\min(\tau) \tag{5}$$

where $\tau$ is a vector of all delays.

When repeater 408 is active, the impulse response may be modified as follows:

$$h(\tau)=\Sigma_i \alpha_i \delta(\tau-\tau_i)+\alpha_{repeater}\delta(\tau-\tau_{repeater}) \tag{6}$$

where $\alpha_{repeater}$ is the attenuation (or gain) induced by repeater 408 and $\tau_{repeater}$ is the propagation delay along the path through repeater 408. Thus, repeater 408 may add additional delay to the channel, which can increase the maximum channel delay (e.g., the time between the first multipath element and the last multipath element in a channel arriving at receiver 404). Note that in some cases the first and last multipath elements may be subject to one or more thresholds, such as a signal strength threshold and a maximum time threshold.

In FIG. 4B, which depicts an outdoor to outdoor signal propagation scenario 450, wireless transmitter 402 (e.g., a base station or radio unit associated with a base station) is transmitting data over a wireless channel to a receiver 404 via multipath wireless channel elements 456A-456B. In this particular example, wireless multipath element 406A reflects off building 452 in transit to receiver 404 and wireless multipath element 456B is received by repeater 458 and then retransmitted to receiver 404. Note that in other examples, repeater 458 could also be an intelligent reflection surface or another type of signal reflector. In this example, tree 454 acts as a blocker preventing direct line of sight transmission between transmitter 402 and receiver 404.

Generally, it is desirable that repeaters 408 and 458 have very low latency, such as a latency lower than the cyclic prefix length used by receiver 404 in order to avoid intersymbol interference (ISI) at receiver 404. However, when repeaters 408 and 458 are operating in a transparent mode (e.g., a mode in which receiver 404 is not aware of the repeater's relaying action), receiver 404 cannot specifically determine the channel effects caused by operation of repeaters 408 and 458, and consequently cannot dynamically affect the operation of repeaters 408 and 458, such as requesting that repeaters 408 and 458 enable or disable operation.

Accordingly, aspects described herein relate to repeater characteristic reports that may be used by receiver 404 to determine, for example, additional channel delay and changes in amplitude in the channel induced by operation of repeaters 408 and 458. Receiver 404 may exploit the information in a repeater characteristic report to reduce ISI and to improve the communication link performance. Further, receiver 404 and repeaters 408 and 458 may jointly optimize the channel, which improves overall performance.

In some cases, a repeater (e.g., 408 or 458) may report characteristics according to factory measurements, internal calibrations, or even via measurements coordinated with transmitter 402 (e.g., with a base station).

Figure 5:
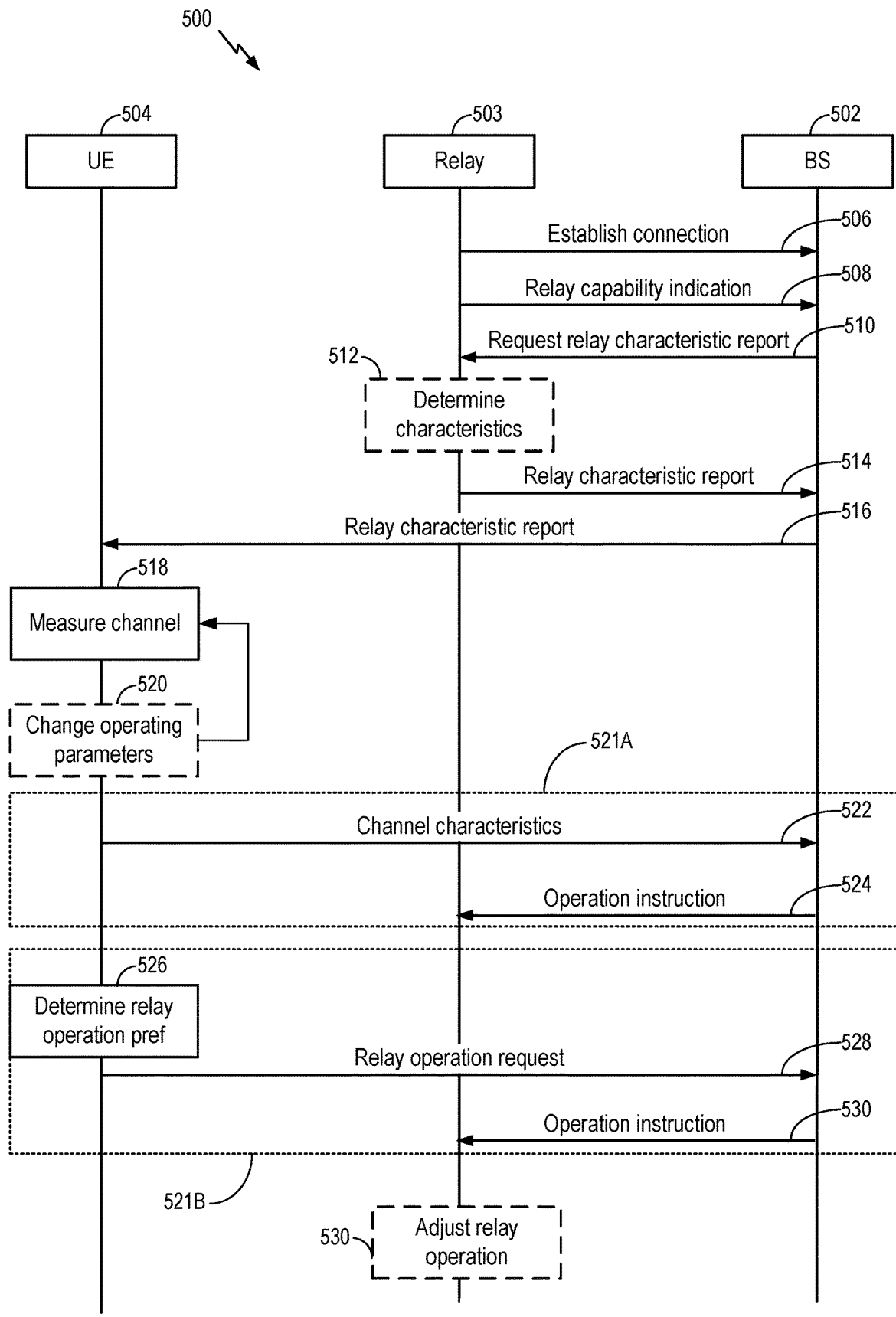
FIG. 5 depicts a process flow for communication in a network between a base station, a user equipment, and a relay.
Figure 6:
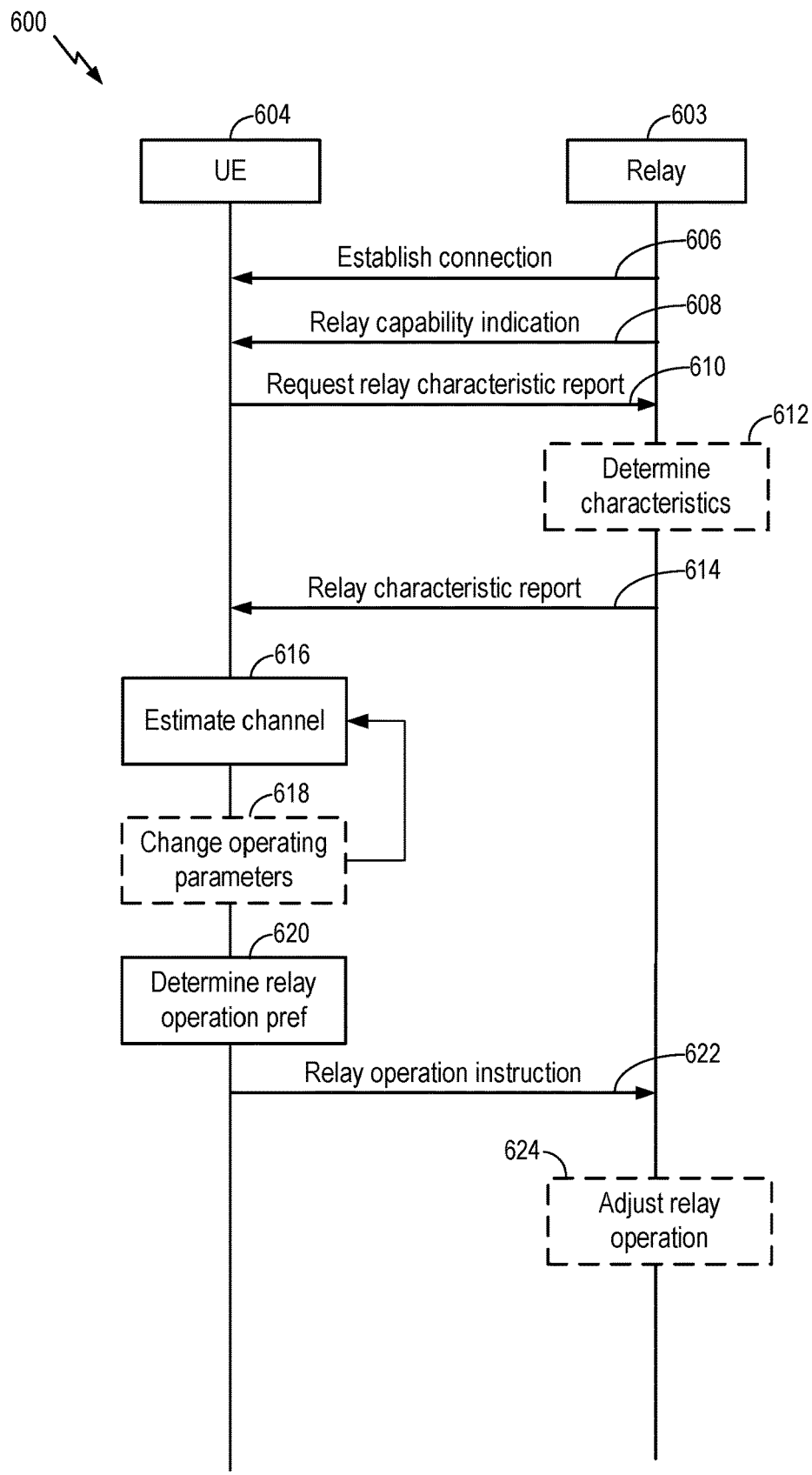
FIG. 6 depicts a process flow for communication between a user equipment and a relay.

FIGS. 5 and 6 describe in further detail examples of how such repeater characteristics reports may be used to improve network performance.

Example Operations of Entities in a Communication Network

FIG. 5 depicts a process flow 500 for communication in a network between a base station (BS) 502, a user equipment (UE) 504, and a relay 503. In some aspects, the BS 502 may be an example of the BS 102 depicted and described with respect to FIGS. 1 and 2. Similarly, the UE 504 may be an example of UE 104 depicted and described with respect to FIGS. 1 and 2. However, in other aspects, BS 502 may be another type of network entity or network node, such as those described herein. Generally, process flow 500 depicts a process for reporting relay 503's characteristics to user equipment 504 with network assistance (e.g., by BS 502 in this example).

Flow 500 begins at step 506 with relay 503 establishing a connection with BS 502.

At step 508, relay 503 transmits a relay capability indication to BS 502. The relay capability indication may generally indicate to BS 502 whether relay 503 is a low latency relay (e.g., a relay having an intrinsic channel delay that satisfies a threshold). Low latency may, in some examples, be relative to a cyclic prefix length being used in communication between BS 502 and UE 504. In some examples, the indication at step 508 may need only a single bit, such as where the indication of latency is binary response of "low" or "high" with respect to some predefined threshold. One benefit of relay 503 indicating relay 503's initial low latency capability to BS 502 is that the remaining process can be avoided if relay 503 is not a low latency relay. Thus, this indication at step 508 may act as an early exit signal for flow 500. In other words, flow 500 may stop at step 508 if the relay capability indication indicates that relay 503 is not a low latency relay and/or does not have a latency that satisfies a threshold.

At step 510, BS 502 requests a relay characteristic report from relay 503. For example, BS 502 may transmit a request for the relay characteristic report to relay 503 based on the relay capability indication indicating that relay 503 is a low latency relay. Note that as compared to the relay capability indication sent from relay 503 to BS 502 in step 508, the relay characteristic report requested by BS 502 at step 510 may include a request for more granular detail of relay 503's operating characteristics, such as relay 503's intrinsic channel delay and/or an amplitude ratio of one or more frequencies used by relay 503 (e.g., related to the gain or attenuation caused by relay 503 when relaying a channel). Generally, relay 503's intrinsic channel delay refers to the channel propagation delay caused by relay 503's reception, processing, and retransmitting of the channel. In other words, if a channel is received be relay 503 at time tree and is retransmitted at time $t_{trans}$, then $t_{delay}=t_{trans}-t_{rec}$ is the intrinsic channel delay.

At step 512, relay 503 optionally determines internal operating characteristics, such as the aforementioned intrinsic channel delay and/or an amplitude ratio of one or more frequencies used by relay 503. In one example, relay 503 may determine these characteristics by accessing stored values that were determined during manufacturing and/or pre-deployment testing. In another example, relay 503 may determine these characteristics by exchanging data with BS 502 (not depicted).

At step 514, relay 503 sends a relay characteristic report to BS 502. For example, relay 503 may send the relay characteristic report based on receiving the request from BS 502 at step 510. Additionally, or alternatively, relay 503 may send the relay characteristic report to BS 502 based on establishing the connection at step 506 (e.g., automatically based on connecting to BS 502).

In some aspects, the relay characteristic report may include one or more of: an intrinsic channel delay of the relay device; an amplitude ratio for one or more frequencies used by the relay device; an operational state of the relay device (e.g., enabled and relaying signals or disabled and not relaying signals); or an identifier for the relay device.

At step 516, BS 502 forwards the relay characteristic report to UE 504.

In some aspects, the relay characteristic report will be signaled when UE 504 is in a connected mode such that a serving network entity (e.g., BS 502 in this example) is configured with information indicating which beam and/or synchronization signal block (SSB) UE 504 is using for communication. BS 502 may also be configured with information indicating which beam and/or SSB relay 503 is using for communication. Accordingly, BS 504 may determine that UE 504 and relay 503 are using the beam (e.g., a same beam) and/or that relay 503 is relaying signals for UE 504. Based on this, BS 502 may send the relay characteristic report to UE 504.

At step 518, UE 504 measures the channel conditions. In some cases, measuring the channel conditions may include estimating, determining, or otherwise calculating one or more of: a channel delay spread of the channel (e.g., via Equation 2, above), a maximum channel delay (e.g., via Equation 5, above); a signal to interference plus noise ratio (SINR); an inter-symbol interference (ISI); a received signal received power (RSRP); a channel capacity, and other channel characteristics. In some aspects, various operating parameters of UE 504 may affect the measured channel conditions, such as, for example, a cyclic prefix backoff setting; a weighted overlap and add (WOLA) setting; an undroop setting, or other settings.

In some aspects, UE 504 can test a performance impact of relay 503 by enabling\disabling the relay in a dedicated time slot, which may be configured with BS 502 in this example. Based on such a test, UE 504 may determine whether relay 503 is helping or hurting channel conditions and change operating parameters based on the test.

In some aspects, UE 504 optionally changes operating parameters at step 520 and then proceeds to re-measure the channel with the new operating parameters at step 518. UE 504 may iteratively measure the channel at step 518 and change operating parameters at step 520 any number of times, including no times.

In a first alternative 521A, UE 504 reports the channel characteristics measured at step 518 to BS 502 at step 522. Based on these channel characteristics, BS 502 decides whether or not to change the operation of relay 503 (e.g., disabling relay 503 if relay 503 is enabled, or enabling relay 503 if relay 503 is disabled).

For example, if a channel delay spread of the channel is too high, a maximum channel delay is too high; a SINR is too low; ISI is present; an RSRP is too low; or a channel capacity is too low, BS 502 may change the operation of relay 503 to try and remedy any one or more of these measured channel characteristics.

At step 524, BS 502 sends an operation instruction to relay 503 to affect the operation of relay 503 (e.g., to enable or disable relay 503). Note that if BS 502 determines that the channel characteristics are within desired operational ranges (e.g., greater than, less than, or within an operating range) with the current relay operational setting, BS 502 may not send an operation instruction at step 524. In other words, BS 502 may send the operation instruction only if a change to the relay operation of relay 503 is indicated. Alternatively, the operating instruction at step 524 may be sent and confirm the current operational setting of relay 503 when no change to the relay operation of relay 503 is indicated. Additionally, or alternatively, the operating instruction at step 524 may indicated a requested relay operation (e.g., enabled or disabled) of relay 503 regardless of the current operational status of relay 503 (e.g., as indicated in the relay characteristic report). Accordingly, in the first alternative 521A, BS 502 determines a preferred relay operation status of relay 503 (e.g., enabled or disabled) based on channel characteristics measured by UE 504.

At step 530, relay 503 optionally adjusts the operational setting of relay 503 (e.g., enabling or disabling the relay operation of relay 503) based on the operation instruction received at step 524 from BS 502. For example, disabling the relay operation of relay 503 in this example means relay 503 will not relay signals received from BS 502 to UE 504. Similarly, enabling relay operation of relay 503 in this example means relay 503 will relay signals received from BS 502 to UE 504.

In a second alternative 521B, UE 504 determines a preference on relay operational setting at step 526 based on the channel conditions measured at step 518.

For example, if UE 504 determines that relay 503 is inducing too much channel delay (e.g., more than a threshold amount of channel delay), UE 502 may prefer that relay 503 cease relaying to UE 504. Alternatively, if the channel conditions are poor and relay 503 is not currently enabled, UE 502 may prefer that relay 503 begin relaying to UE 504. For example, poor channel conditions may include a SINR below a threshold, presence of ISI; an RSRP below a threshold; or a channel capacity below a threshold.

As yet another example, UE 504 may determine that channel conditions are good with relay enabled, and prefer that relay 503 continue in relay 503's current operational setting. For example, good channel conditions may include a SINR above a threshold, absence of ISI; an RSRP above a threshold; or a channel capacity above a threshold.

At step 528, UE 504 transmits a relay operation request to BS 502. The relay operation request may be, for example, for the relay to start relaying to UE 504 if the relay operation of relay 503 is currently disabled, to stop relaying to UE 504 if the relay operation of relay 503 is currently enabled, or to continue with relay 503's present operation. In some examples, the relay operation request indicates a preferred relay operation status of relay 503 (e.g., enabled or disabled).

Note that while not depicted, UE 504 may also send the channel characteristics measured at step 518 in step 528 or in an additional transmission. In such cases, BS 502 may consider both the channel conditions measured by UE 504 and the relay operation preference sent by UE 504 and either confirm or override UE 504's decision.

At step 530, relay 503 optionally adjusts its relay operation. For example, relay 503 may begin relaying to UE 504 if the relay operation is currently disabled, stop relaying to UE 504 if the relay operation is currently enabled, or continue with the relay's present operation. In some cases, relay 503 may modify internal operational settings to adjust relay operations.

For example, relay 503 may change its hardware to reduced latency with the tradeoff of a lower gain. As another example, relay 503 may disable selected component carriers out of a set of component carriers that are otherwise enabled for relaying operations.

Note that the flow 500 may generally be performed periodically or aperiodically based on various channel conditions, communication link characteristics (e.g., frequency range), and based on mobility of the devices involved (e.g., the UE and the relay). For example, SINR conditions may change rapidly in millimeter wave applications, and so flow 500 may be executed periodically at shorter intervals compared to another frequency band that is more stable.

FIG. 6 depicts a process flow 600 for communication between a user equipment (UE) 604 and a relay 603. In some aspects, UE 604 may be an example of UE 104 depicted and described with respect to FIGS. 1 and 2. Generally, process flow 600 depicts a process for reporting relay 603's characteristics to user equipment 604 without network assistance.

Flow 600 begins at step 606 with relay 603 establishing a connection with UE 604. In some aspects, the connection may be via a sideline communication channel (e.g., a device-to-device communication channel). For example, the sidelink communication channel may be a Cat-M1 communication channel or a Cat-M2 communication channel.

At step 608, relay 603 transmits a relay capability indication to UE 604. Similar to the example of FIG. 5, the relay capability indication may generally indicate to UE 604 whether relay 603 is a low latency relay.

At step 610, UE 604 requests a relay characteristic report from relay 603. Similar to the example of FIG. 5, the relay characteristic report requested by UE 604 at step 610 may include a request for more granular detail of relay 603's operating characteristics, such as its intrinsic channel delay and/or an amplitude ratio of one or more frequencies used by relay 603 (e.g., related to the gain or attenuation caused by relay 603 when relaying a channel). As above, relay 603's intrinsic channel delay refers to the channel propagation delay caused by relay 603's reception, processing, and retransmitting of the channel.

At step 612, relay 603 optionally determines internal operating characteristics, such as the aforementioned intrinsic channel delay and/or an amplitude ratio of one or more frequencies used by relay 603. As above, relay 603 may determine these characteristics by accessing stored values that were determined during manufacturing and/or pre-deployment testing.

At step 614, relay 603 sends a relay characteristic report to UE 604. As above, the relay characteristic report may include one or more of: an intrinsic channel delay of the relay device: an amplitude ratio for one or more frequencies used by the relay device; an operational state of the relay device (e.g., enabled and relaying signals or disabled and not relaying signals); or an identifier for the relay device.

At step 616, UE 604 measures the channel conditions. As above, measuring the channel conditions may include estimating, determining, or otherwise calculating one or more of: a channel delay spread of the channel (e.g., via Equation 2, above), a maximum channel delay (e.g., via Equation 5, above); a SINR; an ISI; a RSRP; a channel capacity, and other channel characteristics. In some aspects, various operating parameters of UE 604 may affect the measured channel conditions, such as, for example, a cyclic prefix backoff setting; a weighted overlap and add (WOLA) setting; an undroop setting, or other settings.

In some aspects, UE 604 optionally changes operating parameters at step 618 and then proceeds to re-measure the channel with the new operating parameters at step 616. UE 604 may iteratively measure the channel at step 616 and change operating parameters at step 618 any number of times, including no times.

At step 620, UE 604 determines its preference on relay operational setting based on the channel conditions measured at step 616. For example, if UE 604 determines that relay 603 is inducing too much channel delay (e.g., more than a threshold amount of channel delay), UE 604 may prefer that relay 603 cease relaying to UE 604.

Alternatively, if the channel conditions are poor and relay 603 is not currently enabled, UE 604 may prefer that relay 603 begin relaying to UE 604. For example, poor channel conditions may include a SINR below a threshold, presence of ISI; an RSRP below a threshold; or a channel capacity below a threshold.

As yet another example, UE 604 may determine that channel conditions are good with relay enabled, and prefer that relay 603 continue in its current operational setting. For example, good channel conditions may include a SINR above a threshold, absence of ISI; an RSRP above a threshold; or a channel capacity above a threshold.

At step 622, UE 604 transmits a relay operation instruction to relay 603. In some aspects, the relay operation request indicates a preferred relay operation status of relay 603 (e.g., enabled or disabled). For example, the relay operation instruction may instruct relay 603 to start relaying to UE 604 if relay 603's operation is currently disabled, to stop relaying to UE 604 if relay 603's operation is currently enabled, or to continue with relay 603's present operation.

In some aspects, the operation instruction comprises one or more channel characteristics. For example, the one or more channel characteristics comprise one or more of: a channel delay spread; a maximum channel delay; a signal to interference plus noise ratio (SINR); an inter-symbol interference (ISI); a received signal received power (RSRP); or a channel capacity.

At step 624, relay 603 optionally adjusts its relay operation. For example, relay 603 may begin relaying to UE 604 if relay 603's operation is currently disabled, stop relaying to UE 604 if relay 603's operation is currently enabled, or continue with relay 603's present operation. In some cases, relay 603 may modify internal operational settings to adjust relay operations.

As above with flow 500, flow 600 may generally be performed periodically or aperiodically based on various channel conditions, communication link characteristics, and based on mobility of the devices involved.

FIGS. 5 and 6 thus depict to example flows for reporting relay characteristics and for adjusting operation of a relay in a wireless communication network based on those characteristics. As above, in the example of FIG. 5, the network assists in the flow, while in FIG. 6 the UE and relay handle control without network assistance. While a base station is depicted in FIG. 5 in the network-assisted example, note that other network entities may configured to perform the same steps, and that the base station 502 may be implemented in various ways, such as an aggregated or disaggregated base station. Other flows are possible.

Example Operations of a User Equipment

Figure 7:
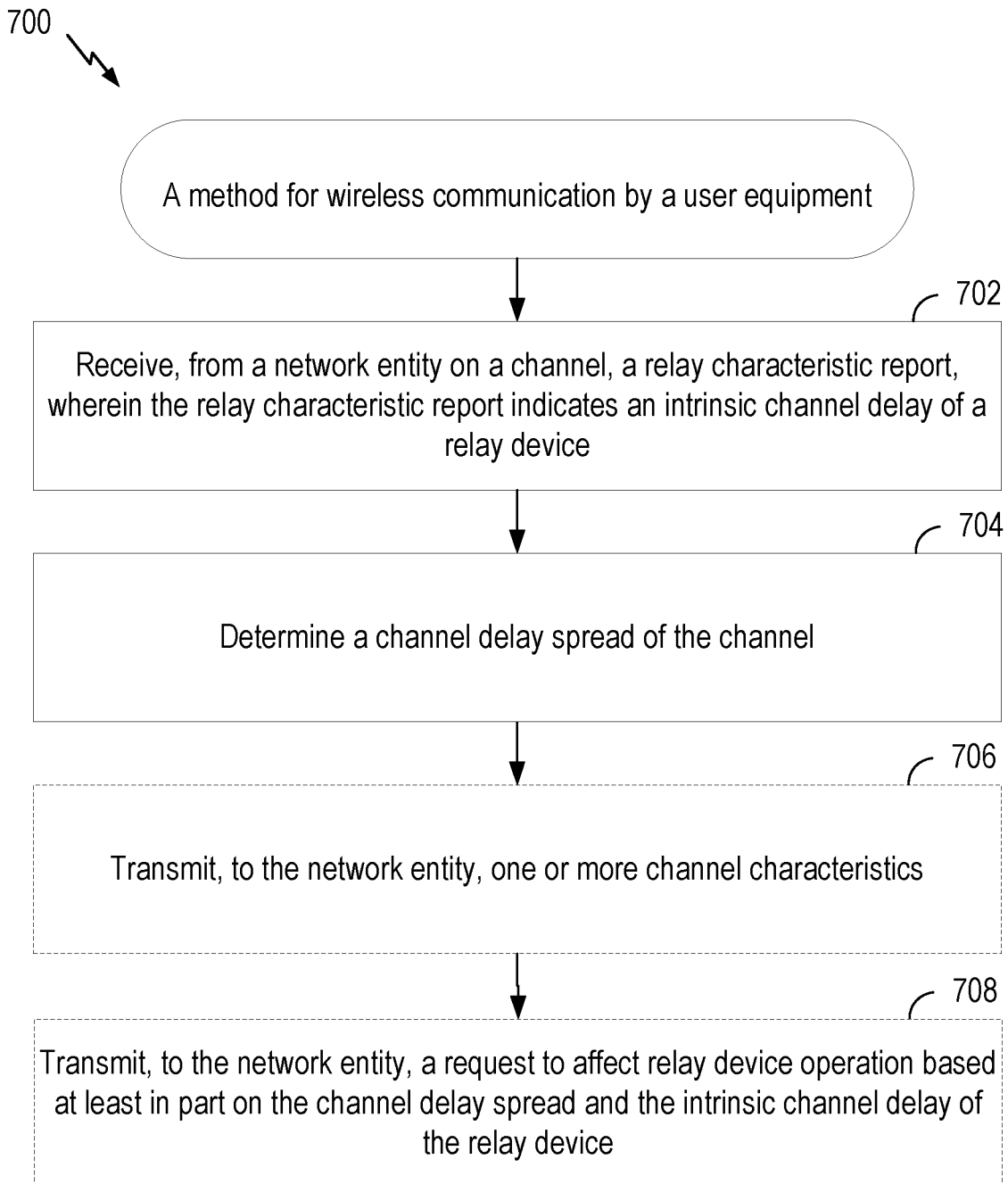
FIG. 7 depicts a method for wireless communication by a user equipment.

FIG. 7 depicts a method 700 for wireless communication by a user equipment, such as UE 104 of FIGS. 1 and 2. In one aspect, method 700 relates to a UE's operation as described with respect to FIG. 5.

Method 700 begins at step 702 with receiving, from a network entity on a channel, a relay characteristic report, wherein the relay characteristic report indicates an intrinsic channel delay of a relay device (e.g., includes an objective intrinsic delay value or range; a subjective intrinsic delay, such as high, medium, or low; a reference or index to a value that can be used for the UE to determine an objective or subjective value; etc.). An example of step 702 is depicted in FIG. 5 with respect to step 516. In some aspects, the network entity is a base station, such as base station 102 described with respect to FIGS. 1 and 2.

Method 700 then proceeds to step 704 with determining a channel delay spread of the channel. An example of step 704 is depicted in FIG. 5 with respect to step 518.

Method 700 then proceeds to optional step 706 with transmitting, to the network entity, one or more channel characteristics. An example of step 706 is depicted in FIG. 5 with respect to step 522.

In some aspects, the one or more channel characteristics comprise one or more of: a channel delay spread; a maximum channel delay; a signal to interference plus noise ratio (SINR); an inter-symbol interference (ISI); a received signal received power (RSRP); or a channel capacity.

Method 700 then proceeds to optional step 708 with transmitting, to the network entity, a request to affect relay device operation based at least in part on the channel delay spread and the intrinsic channel delay of the relay device. An example of step 706 is depicted in FIG. 5 with respect to step 528.

As described above with respect to FIG. 5, in some aspects the user equipment may perform step 706 and not step 708, step 708 and not step 706, or step 706 and 708.

In some aspects, the request to affect relay device operation comprises a request to disable the relay device based at least in part on a maximum delay spread exceeding a channel delay threshold, wherein the maximum delay spread is based at least in part on based on the channel delay spread and the intrinsic channel delay.

In some aspects, the channel delay threshold is based at least in part on a cyclic prefix length used by the user equipment for communications on the channel.

In some aspects, the request to affect relay device operation comprises a request to enable the relay device.

In some aspects, method 700 further includes determining the channel delay spread based at least in part on one or more demodulation reference signals.

In some aspects, method 700 further includes determining the channel delay spread independent of signals from the relay device. For example, if the relay device is not relaying, the channel delay spread may be based on only the multipath signals from the network entity, such as described with respect to FIGS. 4A and 4B.

Figure 12:
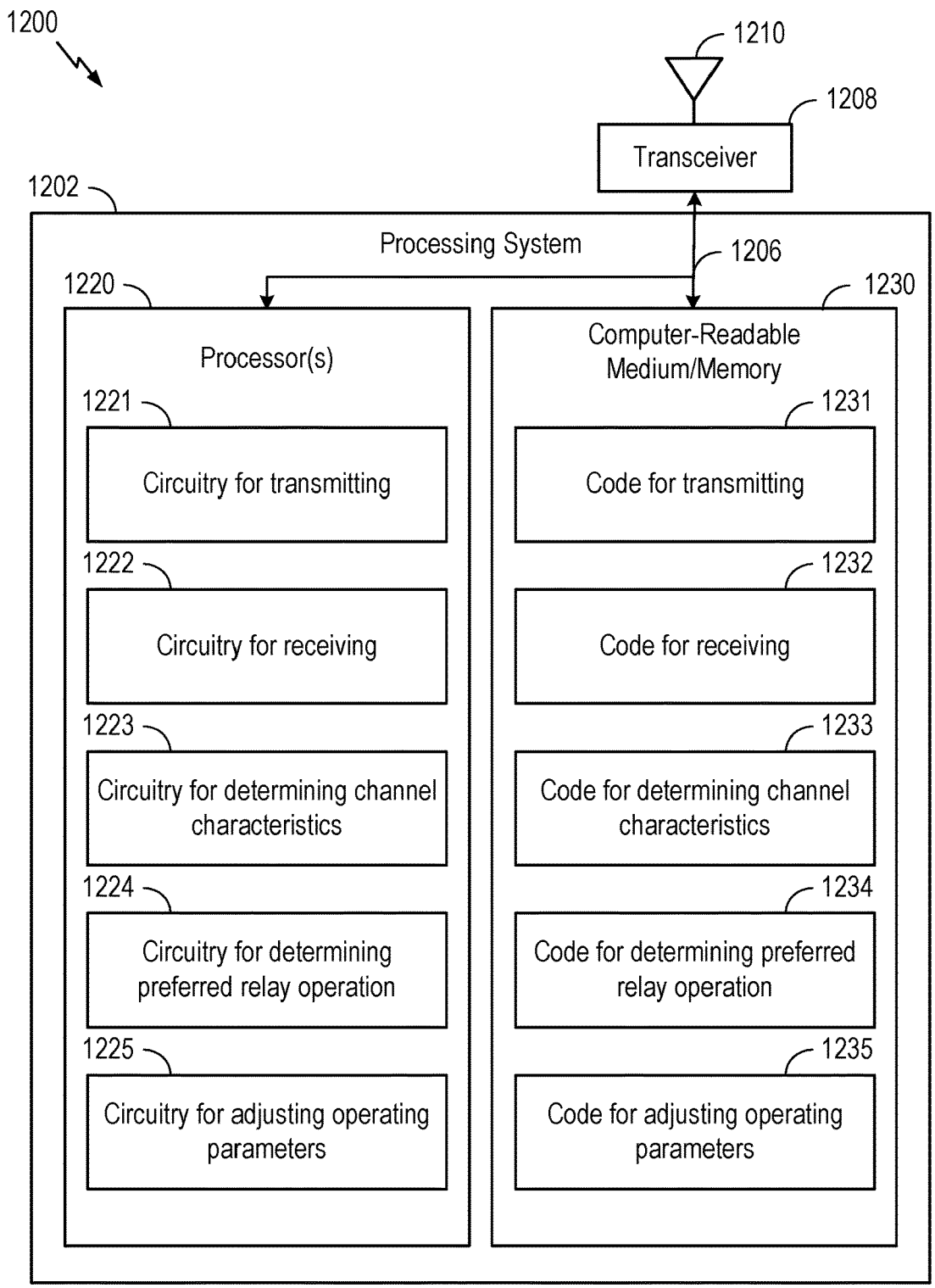
FIG. 12 depicts aspects of an example communications device.

In one aspect, method 700, or any aspect related to method 700, may be performed by an apparatus, such as apparatus 1200 of FIG. 12, which includes various components operable, configured, or adapted to perform the method 700. Apparatus 1200 is described below in further detail.

Note that FIG. 7 is just one example of a method, and other methods including fewer, additional, or alternative steps are possible consistent with this disclosure.

Figure 8:
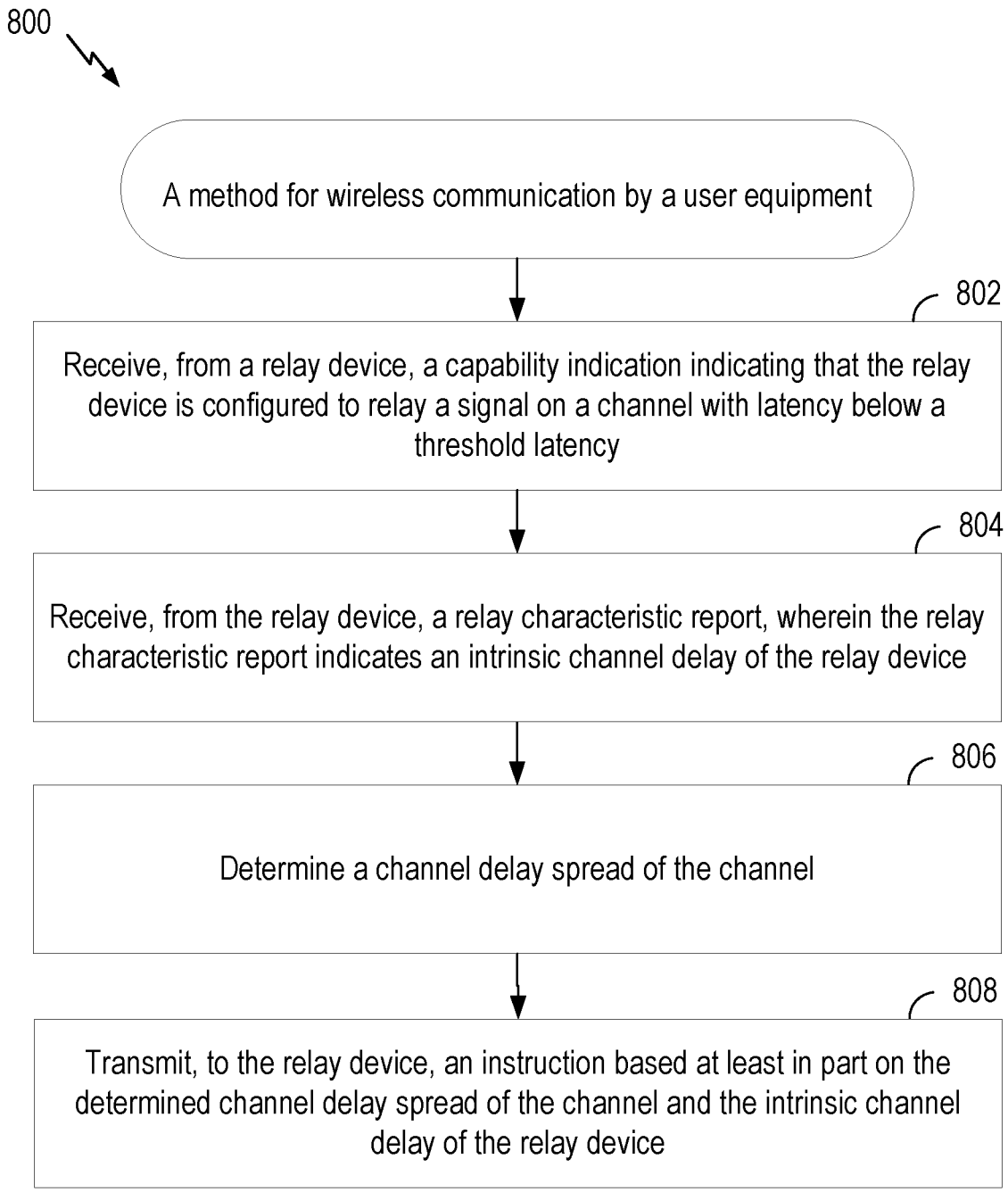
FIG. 8 depicts a method for wireless communication by a user equipment.

FIG. 8 depicts a method 800 for wireless communication by a user equipment, such as UE 104 of FIGS. 1 and 2. In one aspect, method 800 relates to a UE's operation as described with respect to FIG. 6.

Method 800 begins at step 802 with receiving, from a relay device, a capability indication indicating that the relay device is configured to relay a signal on a channel with latency below a threshold latency. An example of step 802 is depicted in FIG. 6 with respect to step 608.

Method 800 then proceeds to step 804 with receiving, from the relay device, a relay characteristic report, wherein the relay characteristic report indicates an intrinsic channel delay of the relay device. An example of step 804 is depicted in FIG. 6 with respect to step 614.

Method 800 then proceeds to step 806 with determining a channel delay spread of the channel. An example of step 806 is depicted in FIG. 6 with respect to step 616.

Method 800 then proceeds to step 808 transmitting, to the relay device, an instruction based at least in part on the determined channel delay spread of the channel and the intrinsic channel delay of the relay device. An example of step 806 is depicted in FIG. 6 with respect to step 622.

In some aspects, method 800 further includes determining a plurality of channel delay spreads of the channel based at least in part on a plurality of cyclic prefix backoff settings, such as depicted and described with respect to steps 616 and 618 of FIG. 6. In such aspects, the instruction (at step 808) may be further based on the plurality of channel delay spreads.

In some aspects, method 800 further includes changing one or more operating parameters based at least in part on the relay characteristic report, such as depicted and described with respect to steps 616 and 618 of FIG. 6. For example, the one or more operating parameters may comprise one or more of: a cyclic prefix backoff setting; a weighted overlap and add (WOLA) setting; or an undroop setting.

In some aspects, the instruction is configured to cause the relay device to disable relay device operation based at least in part on a maximum delay spread exceeding a channel delay threshold, wherein the maximum delay spread is based at least in part on based on the channel delay spread and the intrinsic channel delay. In some aspects, the channel delay threshold is based at least in part on a cyclic prefix length used by the user equipment for communications on the channel.

In some aspects, the instruction is configured to cause the relay device to enable relay device operation.

In some aspects, the instruction comprises one or more channel characteristics. For example, the one or more channel characteristics comprise one or more of: a channel delay spread; a maximum channel delay; a signal to interference plus noise ratio (SINR); an inter-symbol interference (ISI); a received signal received power (RSRP); or a channel capacity.

In some aspects, method 800 further includes receiving, from the relay device via a sidelink communication channel, one or more of: the capability indication and the relay characteristic report. In some aspects, method 800 further includes transmitting, to the relay device via the sidelink communication channel, the instruction. In some aspects, the sidelink communication channel comprises one of: a Cat-M1 communication channel; or a Cat-M2 communication channel.

Example Operations of a Relay Device

Figure 9:
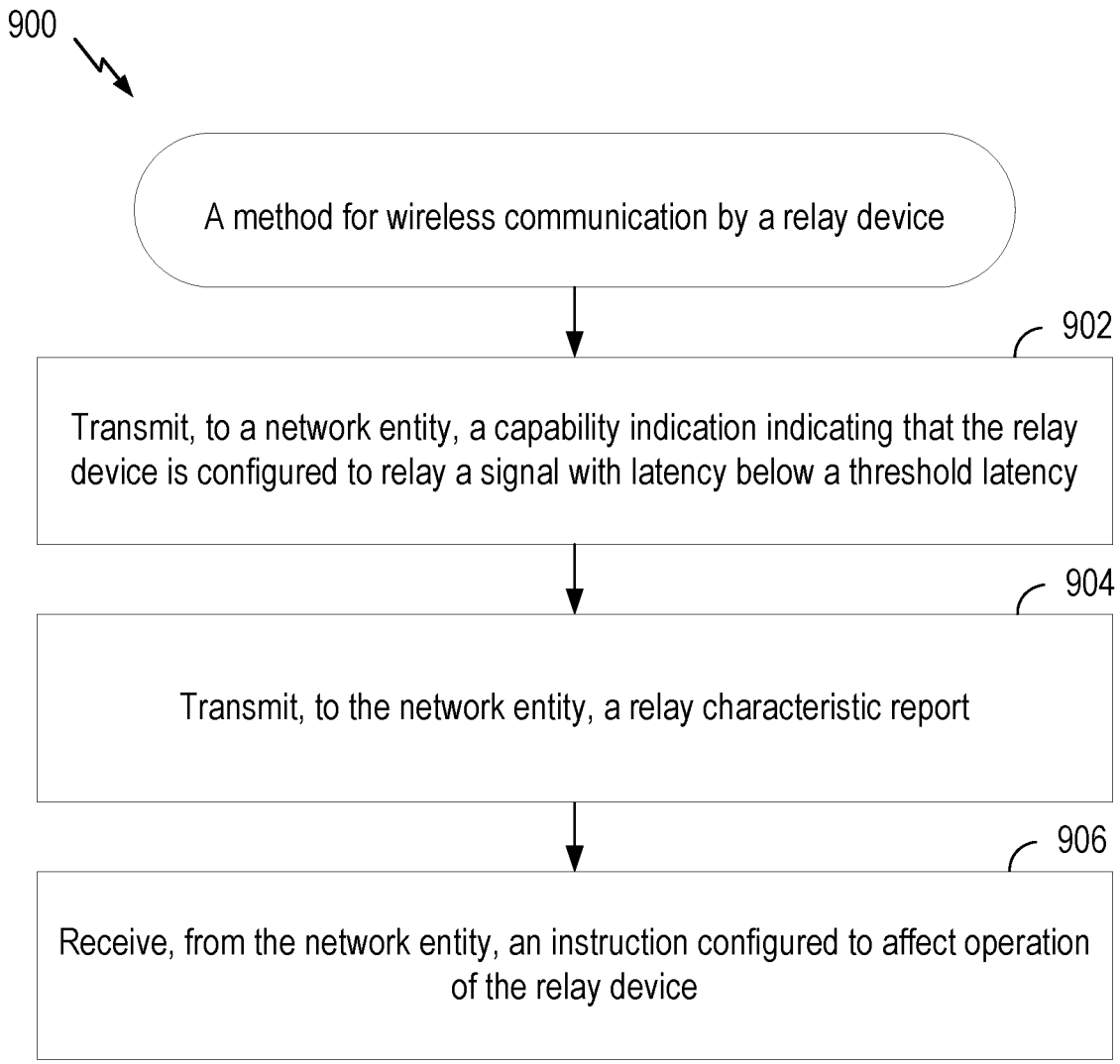
FIG. 9 depicts a method for wireless communication by a relay device.

FIG. 9 depicts a method 900 for wireless communication by a relay device. In one aspect, method 900 relates to a relay device's operation as described with respect to FIG. 5.

Method 900 begins at step 902 with transmitting, to a base station, a capability indication indicating that the relay device is configured to relay a signal with latency below a threshold latency.

Method 900 then proceeds to step 904 with transmitting, to the base station, a relay characteristic report.

Method 900 then proceeds to step 906 with receiving, from the base station, an instruction configured to affect operation of the relay device.

In some aspects, the relay characteristic report comprises one or more of: an intrinsic channel delay of the relay device; or an amplitude ratio for one or more frequencies used by the relay device. For example, the amplitude ratio for each frequency may be a gain or attenuation created by the relay at that frequency when relying signals.

In some aspects, method 900 further includes determining the intrinsic channel delay of the relay device and/or the amplitude ratio for the one or more frequencies used by the relay device.

In some aspects, the instruction is configured to cause the relay device to disable relay device operation. In some aspects, method 900 further includes disabling relay operation based at least in part on the instruction.

In some aspects, the instruction is configured to cause the relay device to enable relay device operation. In some aspects, method 900 further includes enabling relay operation based at least in part on the instruction.

Note that FIG. 9 is just one example of a method, and other methods including fewer, additional, or alternative steps are possible consistent with this disclosure. For example, the relay device of method 900 may communicate with another type of network entity (rather than a base station) in alternative examples.

Figure 10:
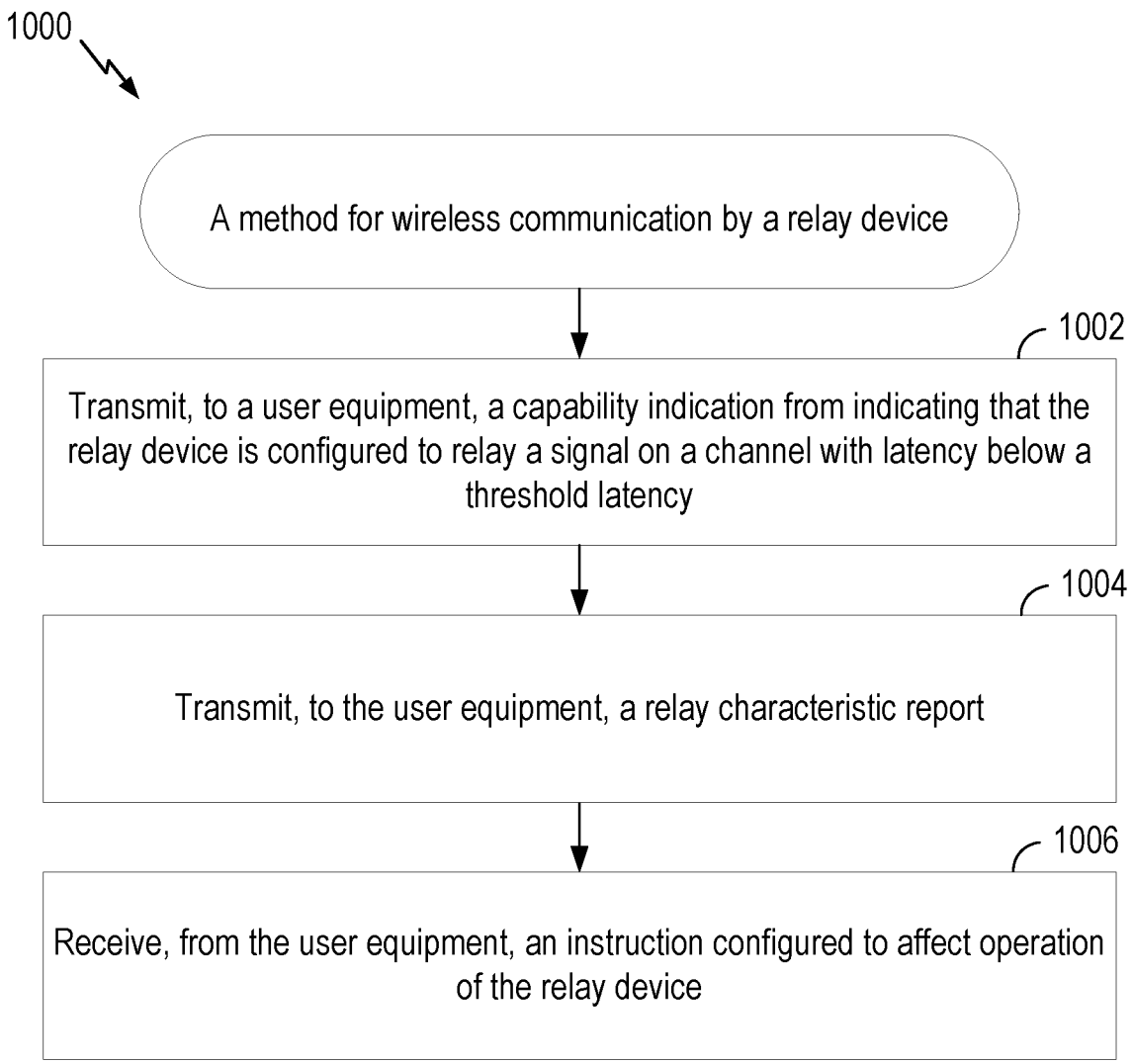
FIG. 10 depicts a method for wireless communication by a relay device.

FIG. 10 depicts a method 1000 for wireless communication by a relay device. In one aspect, method 1000 relates to a relay device's operation as described with respect to FIG. 6.

Method 1000 begins at step 1002 with transmitting, to a user equipment, a capability indication indicating that the relay device is configured to relay a signal on a channel with latency below a threshold latency.

Method 1000 then proceeds to step 1004 with transmitting, to the user equipment, a relay characteristic report.

In some aspects, the relay characteristic report comprises one or more of: an intrinsic channel delay of the relay device; or an amplitude ratio for one or more frequencies used by the relay device.

Method 1000 then proceeds to step 1006 with receiving, from the user equipment, an instruction configured to affect operation of the relay device.

In some aspects, method 1000 further includes determining the intrinsic channel delay of the relay device and/or an amplitude ratio for the one or more frequencies used by the relay device.

In some aspects, the instruction comprises a request to disable the relay device. In some aspects, method 1000 further includes disabling relay operation based at least in part on the instruction.

In some aspects, the instruction comprises a request to enable the relay device. In some aspects, method 1000 further includes enabling relay operation based at least in part on the instruction.

In some aspects, the instruction comprises one or more channel characteristics, which may include, for example one or more of: a channel delay spread; a maximum channel delay; a signal to interference plus noise ratio (SINR); an inter-symbol interference (ISI); a received signal received power (RSRP); or a channel capacity.

In some aspects, method 1000 further includes transmitting, to the user equipment via a sidelink communication channel, one or more of the capability indication and the relay characteristic report.

In some aspects, method 1000 further includes receiving, from the user equipment via the sidelink communication channel, the instruction.

In some aspects, the sidelink communication channel comprises one of: a Cat-M1 communication channel; or a Cat-M2 communication channel.

Note that FIG. 10 is just one example of a method, and other methods including fewer, additional, or alternative steps are possible consistent with this disclosure.

Example Operations of a Network Entity

Figure 11:
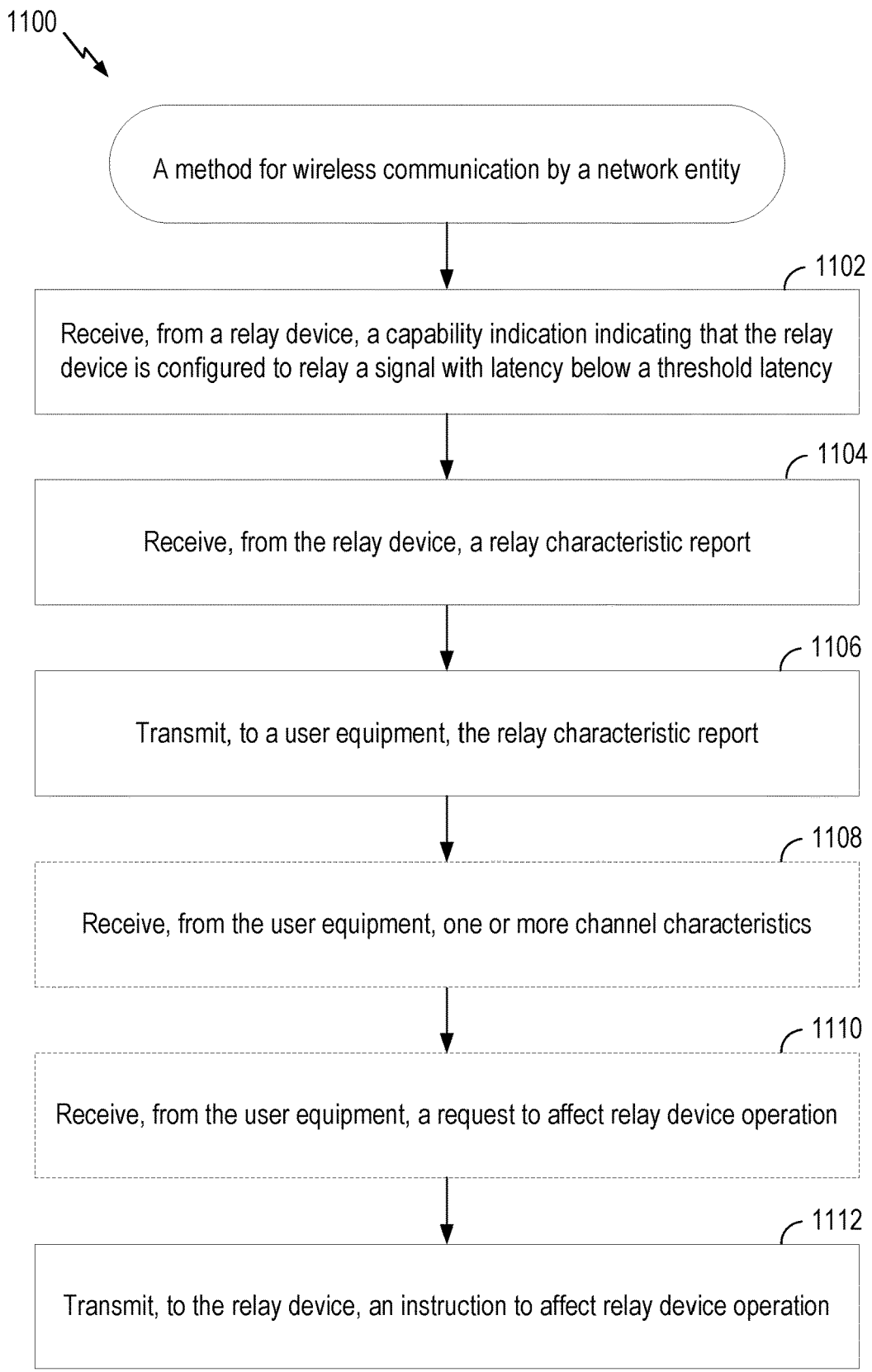
FIG. 11 depicts a method for wireless communication by a network entity.

FIG. 11 depicts a method 1100 for wireless communication by a network entity, such as BS 102 of FIGS. 1 and 2. In one aspect, method 1100 relates to a base station's operation as described with respect to FIG. 5.

Method 1100 begins at step 1102 with receive, from a relay device, a capability indication indicating that the relay device is configured to relay a signal with latency below a threshold latency. An example of step 1102 is depicted in FIG. 5 with respect to step 508.

Method 1100 then proceeds to step 1104 with receiving, from the relay device, a relay characteristic report. An example of step 1104 is depicted in FIG. 5 with respect to step 510.

In some aspects, the relay characteristic report comprises one or more of: an intrinsic channel delay of the relay device; or an amplitude ratio for one or more frequencies used by the relay device.

Method 1100 then proceeds to step 1106 with transmitting, to a user equipment, the relay characteristic report. An example of step 1106 is depicted in FIG. 5 with respect to step 516.

Method 1100 then proceeds to optional step 1108 with receiving, from the user equipment, one or more channel characteristics. An example of step 1108 is depicted in FIG. 5 with respect to step 522. In some aspects, the one or more channel characteristics comprise one or more of: a channel delay spread; a maximum channel delay; a signal to interference plus noise ratio; an inter-symbol interference; a received signal received power; or a channel capacity.

Method 1100 then proceeds to optional step 1110 with receiving, from the user equipment, a request to affect relay device operation. An example of step 1110 is depicted in FIG. 5 with respect to step 528.

In some aspects, the request to affect relay device operation comprises a request to disable the relay device. In some aspects, the request to affect relay device operation comprises a request to enable the relay device.

As described above with respect to FIG. 5, in some aspects the network entity may perform step 1108 and not step 1110, step 1110 and not step 1108, or step 1108 and 1110.

Method 1100 then proceeds to step 1112 with transmitting, to the relay device, an instruction to affect relay device operation. An example of step 1112 is depicted in FIG. 5 with respect to steps 524 and 530.

Note that FIG. 11 is just one example of a method, and other methods including fewer, additional, or alternative steps are possible consistent with this disclosure.

Example Communication Devices

FIG. 12 depicts aspects of an example communications device 1200. In some aspects, communications device 1200 is a user equipment, such as UE 104 described above with respect to FIGS. 1 and 2.

The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes one or more processors 1220. In various aspects, the one or more processors 1220 may be representative of one or more of receive processor 258, transmit processor 264, TX MIMO processor 266, and/or controller/processor 280, as described with respect to FIG. 2. The one or more processors 1220 are coupled to a computer-readable medium/memory 1230 via a bus 1206. In certain aspects, the computer-readable medium/memory 1230 is configured to store instructions (e.g., computer-executable code) that when executed by the one or more processors 1220, cause the one or more processors 1220 to perform the methods 700 and 800 described with respect to FIGS. 7 and 8, respectively, or any aspect related to those methods. Note that reference to a processor performing a function of communications device 1200 may include one or more processors performing that function of communications device 1200.

In the depicted example, computer-readable medium/memory 1230 stores code (e.g., executable instructions) for transmitting 1231, code for receiving 1232, code for determining channel characteristics 1233, code for determining preferred relay operation 1234, and code for adjusting operating parameters 1235. Processing of the code 1231-1235 may cause the communication device 1200 to perform the methods 700 and 800 described with respect to FIGS. 7 and 8, respectively.

The one or more processors 1220 include circuitry configured to implement (e.g., execute) the code stored in the computer-readable medium/memory 1230, including circuitry for transmitting 1221, circuitry for receiving 1222, circuitry for determining channel characteristics 1223, circuitry for determining preferred relay operation 1224, and circuitry for adjusting operating parameters 1225. Processing with circuitry 1221-1225 may cause the communication device 1200 to perform the methods 700 and 800 described with respect to FIGS. 7 and 8, respectively.

Various components of the communications device 1200 may provide means for performing the methods 700 and 800 described with respect to FIGS. 7 and 8, respectively, or any aspect related to methods 700 and 800. For example, means for transmitting, sending or outputting for transmission may include the transceivers 254 and/or antenna(s) 252 of the UE 104 illustrated in FIG. 2 and/or transceiver 1208 and antenna 1210 of the communication device 1200 in FIG. 12. Means for receiving or obtaining may include the transceivers 254 and/or antenna(s) 252 of the UE 104 illustrated in FIG. 2 and/or transceiver 1208 and antenna 1210 of the communication device 1200 in FIG. 12.

Figure 13:
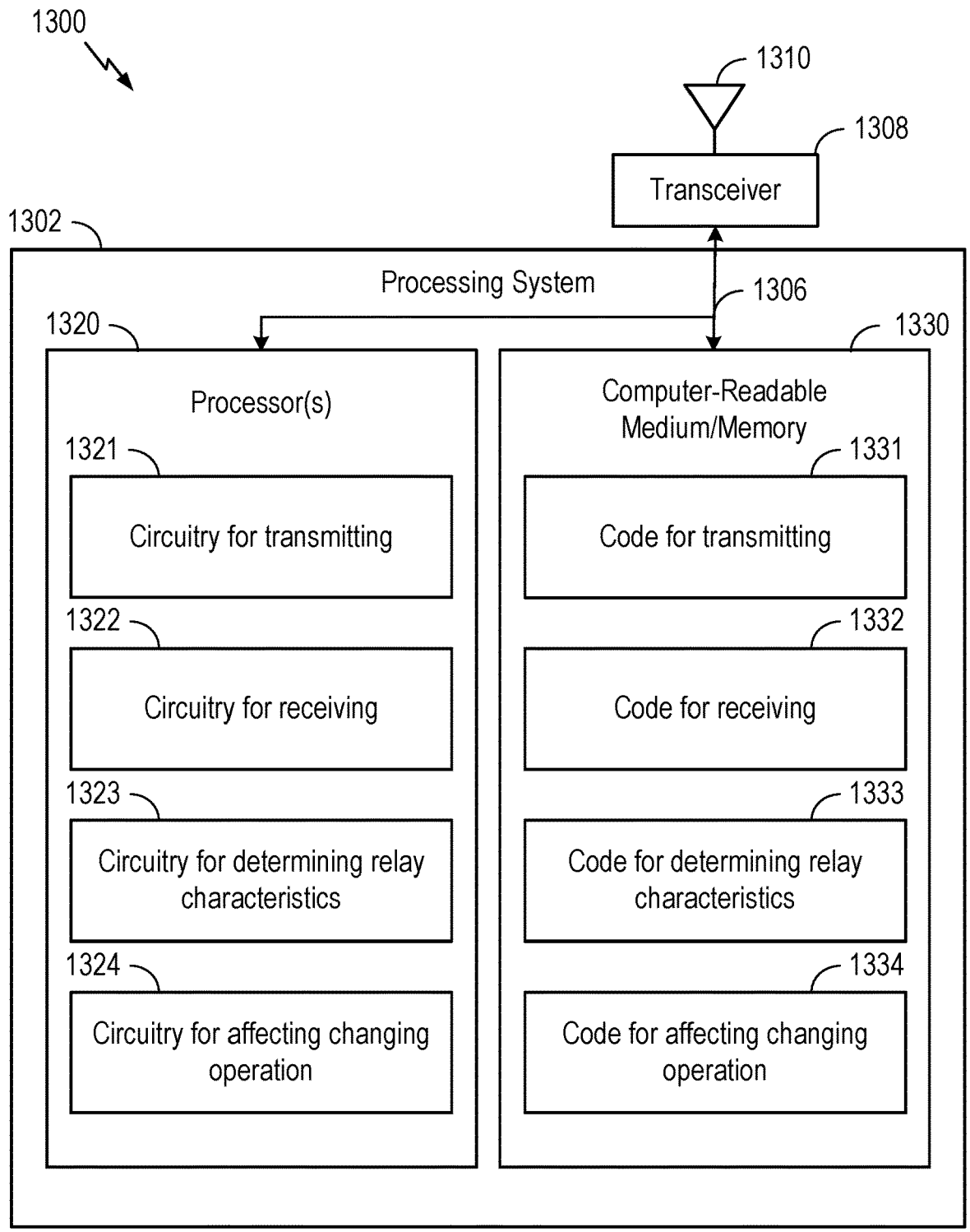
FIG. 13 depicts aspects of an example communications device.

FIG. 13 depicts aspects of another example communications device 1300. In some aspects, communications device 1300 is a relay device.

The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes one or more processors 1320. The one or more processors 1320 are coupled to a computer-readable medium/memory 1330 via a bus 1306. In certain aspects, the computer-readable medium/memory 1330 is configured to store instructions (e.g., computer-executable code) that when executed by the one or more processors 1320, cause the one or more processors 1320 to perform the methods 900 and 1000 described with respect to FIGS. 9 and 10, respectively, or any aspect related to those methods. Note that reference to a processor performing a function of communications device 1300 may include one or more processors performing that function of communications device 1300.

In the depicted example, computer-readable medium/memory 1330 stores code (e.g., executable instructions) for transmitting 1331, code for receiving 1332, code for determining relay characteristics 1333, and code for changing relay operation 1334. Processing of the code 1331-1334 may cause the communication device 1300 to perform the methods 900 and 1000 described with respect to FIGS. 9 and 10, respectively.

The one or more processors 1320 include circuitry configured to implement (e.g., execute) the code stored in the computer-readable medium/memory 1330, including circuitry for transmitting 1321, circuitry for receiving 1322, circuitry for determining relay characteristics 1323, and circuitry for affecting relay operation 1324. Processing with circuitry 1321-1324 may cause the communication device 1300 to perform the methods 900 and 1000 described with respect to FIGS. 9 and 10, respectively.

Various components of the communications device 1300 may provide means for performing the methods 900 and 1000 described with respect to FIGS. 9 and 10, respectively, or any aspect related to methods 900 and 1000.

Figure 14:
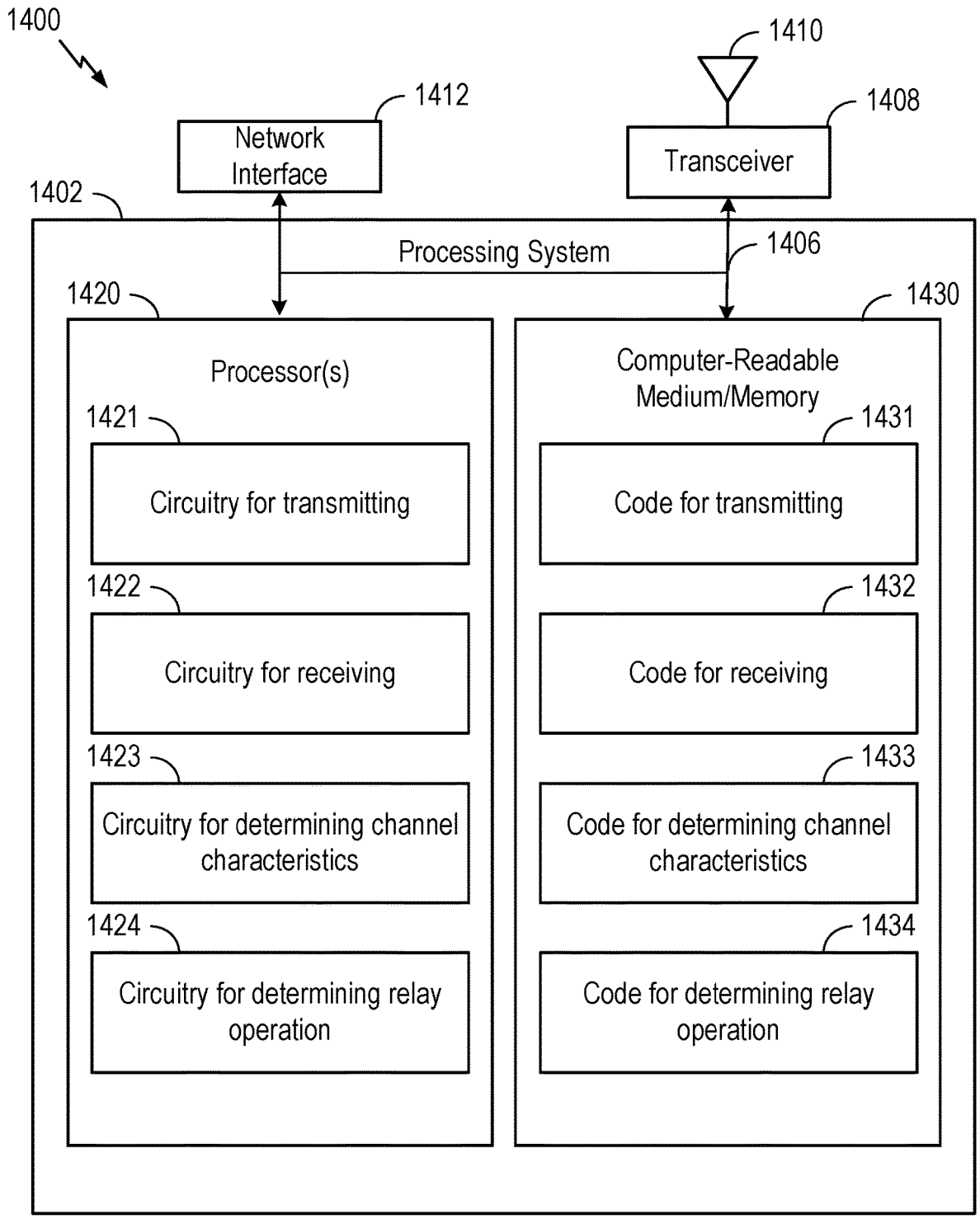
FIG. 14 depicts aspects of an example communications device.

FIG. 14 depicts aspects of an example communications device. In some aspects, communications device 1400 is a user equipment, such as BS 102 described above with respect to FIGS. 1 and 2.

The communications device 1400 includes a processing system 1402 coupled to a transceiver 1408 (e.g., a transmitter and/or a receiver) and/or a network interface 1412. The transceiver 1408 is configured to transmit and receive signals for the communications device 1400 via an antenna 1410, such as the various signals as described herein. The network interface 1412 is configured to obtain and send signals for the communications device 1400 via communication link(s), such as a backhaul link, midhaul link, and/or fronthaul link, between aspects of a network entity, such as a CU, DU, or RU as described herein. The processing system 1402 may be configured to perform processing functions for the communications device 1400, including processing signals received and/or to be transmitted by the communications device 1400.

The processing system 1402 includes one or more processors 1420. In various aspects, one or more processors 1420 may be representative of one or more of receive processor 238, transmit processor 220, TX MIMO processor 230, and/or controller/processor 240, as described with respect to FIG. 2. The one or more processors 1420 are coupled to a computer-readable medium/memory 1430 via a bus 1406. In certain aspects, the computer-readable medium/memory 1430 is configured to store instructions (e.g., computer-executable code) that when executed by the one or more processors 1420, cause the one or more processors 1420 to perform the method 1100 of FIG. 11, or any aspect related to method 1100. Note that reference to a processor performing a function of communications device 1400 may include one or more processors performing that function of communications device 1400.

In the depicted example, the computer-readable medium/memory 1430 stores code (e.g., executable instructions) for transmitting 1431, code for receiving 1432, code for determining channel characteristics 1433, and code for determining relay operation 1434. Processing of the code 1431-1434 may cause the communication device 1400 to perform the method 1100 of FIG. 11, or any aspect related to method 1100.

The one or more processors 1420 include circuitry configured to implement (e.g., execute) the code stored in the computer-readable medium/memory 1430, including circuitry for transmitting 1421, circuitry for receiving 1422, circuitry for determining channel characteristics 1423, and v for determining relay operation 1424. Processing with circuitry 1421-1424 may cause the communication device 1400 to perform the method 1100 described with respect to FIG. 11, or any aspect related to method 1100.

Various components of the communications device 1400 may provide means for performing the method 1100 or any aspect related to method 1100. Means for transmitting, sending or outputting for transmission may include the transceivers 232 and/or antenna(s) 234 of the BS 102 illustrated in FIG. 2 and/or transceiver 1408 and antenna 1410 of the communication device 1400 in FIG. 14. Means for receiving or obtaining may include the transceivers 232 and/or antenna(s) 234 of the BS 102 illustrated in FIG. 2 and/or transceiver 1408 and antenna 1410 of the communication device 1400 in FIG. 14.

Example Clauses

Implementation examples are described in the following numbered clauses:

Clause 1: A method for wireless communication by a network entity, comprising: receiving, from a relay device, a capability indication indicating that the relay device is configured to relay a signal with latency below a threshold latency; receiving, from the relay device, a relay characteristic report; transmitting, to a user equipment, the relay characteristic report; receiving, from the user equipment, a request to affect relay device operation; and transmitting, to the relay device, an instruction based at least in part on the request to affect relay device operation.

Clause 2: The method of Clause 1, wherein the relay characteristic report indicates one or more of: an intrinsic channel delay of the relay device; or an amplitude ratio for one or more frequencies used by the relay device.

Clause 3: The method of any one of Clauses 1-2, wherein the request to affect relay device operation comprises a request to disable the relay device.

Clause 4: The method of any one of Clauses 1-3, wherein the request to affect relay device operation comprises a request to enable the relay device.

Clause 5: The method of any one of Clauses 1-4, further comprising receiving, from the user equipment, one or more channel characteristics.

Clause 6: The method of v 5, wherein the one or more channel characteristics comprise one or more of: a channel delay spread; a maximum channel delay; a signal to interference plus noise ratio; an inter-symbol interference; a received signal received power; or a channel capacity.

Clause 7: A method for wireless communication by a user equipment, comprising: receiving, from a network entity on a channel, a relay characteristic report, wherein the relay characteristic report indicates an intrinsic channel delay of a relay device; determining a channel delay spread of the channel; and transmitting, to the network entity, a request to affect relay device operation based at least in part on the channel delay spread and the intrinsic channel delay of the relay device.

Clause 8: The method of Clause 7, wherein the request to affect relay device operation comprises a request to disable the relay device based at least in part on a maximum delay spread exceeding a channel delay threshold, wherein the maximum delay spread is based at least in part on based on the channel delay spread and the intrinsic channel delay.

Clause 9: The method of Clause 8, wherein the channel delay threshold is based at least in part on a cyclic prefix length used by the user equipment for communications on the channel.

Clause 10: The method of any one of Clauses 7-9, wherein the request to affect relay device operation comprises a request to enable the relay device.

Clause 11: The method of any one of Clauses 7-10, further comprising transmitting, to the network entity, one or more channel characteristics.

Clause 12: The method of Clause 11, wherein the one or more channel characteristics comprise one or more of: a channel delay spread; a maximum channel delay; a signal to interference plus noise ratio; an inter-symbol interference; a received signal received power; or a channel capacity.

Clause 13: The method of any one of Clauses 7-12, wherein determining the channel delay spread is based at least in part on one or more demodulation reference signals.

Clause 14: The method of any one of Clauses 7-13, further comprising determining the channel delay spread of the channel independent of signals from the relay device.

Clause 15: A method for wireless communication by a relay device, comprising: transmitting, to a network entity, a capability indication indicating that the relay device is configured to relay a signal with latency below a threshold latency; transmitting, to the network entity, a relay characteristic report; and receiving, from the network entity, an instruction configured to affect operation of the relay device.

Clause 16: The method of Clause 15, wherein the relay characteristic report indicates one or more of: an intrinsic channel delay of the relay device; or an amplitude ratio for one or more frequencies used by the relay device.

Clause 17: The method of Clause 16, further comprising: determining the intrinsic channel delay of the relay device; and determining the amplitude ratio for the one or more frequencies used by the relay device.

Clause 18: The method of any one of Clauses 15-17, wherein the instruction is configured to cause the relay device to disable relay device operation.

Clause 19: The method of Clause 18, further comprising disabling relay operation based at least in part on the instruction.

Clause 20: The method of any one of Clauses 15-17, wherein the instruction is configured to cause the relay device to enable relay device operation.

Clause 21: The method of Clause 20, further comprising enabling relay operation based at least in part on the instruction.

Clause 22: A method for wireless communication by a user equipment, comprising: receiving, from a relay device, a capability indication indicating that the relay device is configured to relay a signal on a channel with latency below a threshold latency; receiving, from the relay device, a relay characteristic report, wherein the relay characteristic report indicates an intrinsic channel delay of the relay device; determining a channel delay spread of the channel; and transmitting, to the relay device, an instruction based at least in part on the determined channel delay spread of the channel and the intrinsic channel delay of the relay device.

Clause 23: The method of Clause 22, further comprising: determining a plurality of channel delay spreads of the channel based at least in part on a plurality of cyclic prefix backoff settings, wherein the instruction is further based on the plurality of channel delay spreads.

Clause 24: The method of any one of Clauses 22-23, further comprising: changing one or more operating parameters based at least in part on the relay characteristic report, wherein the one or more operating parameters comprises one or more of: a cyclic prefix backoff setting; a weighted overlap and add (WOLA) setting; or an undroop setting.

Clause 25: The method of any one of Clauses 22-24, wherein the instruction is configured to cause the relay device to disable relay device operation based at least in part on a maximum delay spread exceeding a channel delay threshold, and wherein the maximum delay spread is based at least in part on based on the channel delay spread and the intrinsic channel delay.

Clause 26: The method of Clause 25, wherein the channel delay threshold is based at least in part on a cyclic prefix length used by the user equipment for communications on the channel.

Clause 27: The method of any one of Clauses 22-26, wherein the instruction is configured to cause the relay device to enable relay device operation.

Clause 28: The method of any one of Clauses 22-27, wherein the instruction comprises one or more channel characteristics.

Clause 29: The method of Clause 28, wherein the one or more channel characteristics comprise one or more of: a channel delay spread; a maximum channel delay; a signal to interference plus noise ratio; an inter-symbol interference; a received signal received power; or a channel capacity.

Clause 30: The method of any one of Clauses 22-29, further comprising: receiving, from the relay device via a sidelink communication channel, the capability indication; receiving, from the relay device via the sidelink communication channel, the relay characteristic report; and transmitting, to the relay device via the sidelink communication channel, the instruction.

Clause 31: The method of Clause 30, wherein the sidelink communication channel comprises one of: a Cat-M1 communication channel; or a Cat-M2 communication channel.

Clause 32: A method for wireless communication by a relay device, comprising: transmitting, to a user equipment, a capability indication indicating that the relay device is configured to relay a signal on a channel with latency below a threshold latency; transmitting, to the user equipment, a relay characteristic report; and receiving, from the user equipment, an instruction configured to affect operation of the relay device.

Clause 33: The method of Clause 32, wherein the relay characteristic report indicates one or more of: an intrinsic channel delay of the relay device; or an amplitude ratio for one or more frequencies used by the relay device.

Clause 34: The method of Clause 33, further comprising: determining the intrinsic channel delay of the relay device; and determining the amplitude ratio for the one or more frequencies used by the relay device.

Clause 35: The method of any one of Clauses 32-34, wherein the instruction comprises a request to disable the relay device.

Clause 36: The method of Clause 35, further comprising disabling relay operation based at least in part on the instruction.

Clause 37: The method of any one of Clauses 32-34, wherein the instruction comprises a request to enable the relay device.

Clause 38: The method of Clause 37, further comprising enabling relay operation based at least in part on the instruction.

Clause 39: The method of any one of Clauses 32-38, wherein the instruction comprises one or more channel characteristics.

Clause 40: The method of Clause 39, wherein the one or more channel characteristics comprise one or more of: a channel delay spread; a maximum channel delay; a signal to interference plus noise ratio; an inter-symbol interference; a received signal received power; or a channel capacity.

Clause 41: The method of any one of Clauses 32-40, further comprising: transmitting, to the user equipment via a sidelink communication channel, the capability indication; transmitting, to the user equipment via the sidelink communication channel, the relay characteristic report; and receiving, from the user equipment via the sidelink communication channel, the instruction.

Clause 42: The method of Clause 41, wherein the sidelink communication channel comprises one of: a Cat-M1 communication channel; or a Cat-M2 communication channel.

Clause 43: A method for wireless communication by a user equipment, comprising: receiving a relay characteristic report, wherein the relay characteristic report indicates an intrinsic channel delay of a relay device; determining a channel delay spread of the channel; and transmitting an indication to affect relay device operation based at least in part on the channel delay spread and the intrinsic channel delay of the relay device.

Clause 44: A method for wireless communication by a relay device, comprising: transmitting a capability indication indicating that the relay device is configured to relay a signal with latency below a threshold latency; transmitting a relay characteristic report; and receiving an instruction configured to affect operation of the relay device.

Clause 45: An apparatus, comprising: a memory comprising executable instructions; and a processor configured to execute the executable instructions and cause the apparatus to perform a method in accordance with any one of Clauses 1-44.

Clause 46: An apparatus, comprising means for performing a method in accordance with any one of Clauses 1-44.

Clause 47: A non-transitory computer-readable medium comprising executable instructions that, when executed by a processor of an apparatus, cause the apparatus to perform a method in accordance with any one of Clauses 1-44.

Clause 48: A computer program product embodied on a computer-readable storage medium comprising code for performing a method in accordance with any one of Clauses 1-44.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A network entity configured for wireless communication, comprising:
   memory comprising computer-executable instructions; and
   one or more processors, individually or collectively, configured to execute the computer-executable instructions and cause the network entity to:
      receive, from a relay device, a capability indication indicating that the relay device is configured to relay a signal with latency below a threshold latency;
      receive, from the relay device and based on the capability indication indicating that the relay device is configured to relay a signal with latency below the threshold latency, a relay characteristic report;
      transmit, to a user equipment, the relay characteristic report;
      receive, from the user equipment, a request to affect relay device operation; and
      transmit, to the relay device, an instruction based at least in part on the request to affect relay device operation.

2. The network entity of claim 1, wherein the relay characteristic report indicates one or more of:
   an intrinsic channel delay of the relay device; or
   an amplitude ratio for one or more frequencies used by the relay device.

3. The network entity of claim 1, wherein the request to affect relay device operation comprises a request to disable the relay device.

4. The network entity of claim 1, wherein the request to affect relay device operation comprises a request to enable the relay device.

5. The network entity of claim 1, wherein the one or more processors are, individually or collectively, configured to execute the computer-executable instructions and further cause the network entity to receive, from the user equipment, one or more channel characteristics.

6. The network entity of claim 5, wherein the one or more channel characteristics comprise one or more of:
   a channel delay spread;
   a maximum channel delay;
   a signal to interference plus noise ratio;
   an inter-symbol interference;
   a received signal received power; or
   a channel capacity.

7. The network entity of claim 1, wherein the one or more processors, individually or collectively, are configured to execute the computer-executable instructions to further cause the network entity to:
   transmit a request for the relay characteristic report based on the relay capability indication,
   wherein the relay characteristic report is received based on the request for the relay characteristic report.

8. A relay device configured for wireless communication, comprising:
   memory comprising computer-executable instructions; and
   one or more processors, individually or collectively, configured to execute the computer-executable instructions and cause the relay device to:
      transmit a capability indication indicating that the relay device is configured to relay a signal with latency below a threshold latency;
      transmit, based on the relay device being configured to relay a signal with latency below a threshold latency, a relay characteristic report, wherein the relay characteristic report indicates at least one or more of an intrinsic channel delay of the relay device or an amplitude ratio for one or more frequencies used by the relay device; and
      receive an instruction configured to affect operation of the relay device.

9. The relay device of claim 8, wherein the one or more processors are, individually or collectively, configured to execute the computer-executable instructions and further cause the relay device to:
   determine the intrinsic channel delay of the relay device; and
   determine the amplitude ratio for the one or more frequencies used by the relay device.

10. The relay device of claim 8, wherein the instruction is configured to cause the relay device to disable relay device operation.

11. The relay device of claim 10, wherein the one or more processors are, individually or collectively, configured to execute the computer-executable instructions and further cause the relay device to disable relay operation based at least in part on the instruction.

12. The relay device of claim 8, wherein the instruction is configured to cause the relay device to enable relay device operation.

13. The relay device of claim 12, wherein the one or more processors are, individually or collectively, configured to execute the computer-executable instructions and further cause the relay device to enable relay operation based at least in part on the instruction.

14. The relay device of claim 8, wherein the one or more processors are, individually or collectively, configured to execute the computer-executable instructions and further cause the relay device to:
   transmit the capability indication to a user equipment via a sidelink communication channel;

transmit the relay characteristic report to the user equipment via the sidelink communication channel; and
receive the instruction from a user equipment via the sidelink communication channel.

15. The network entity of claim 8, wherein the one or more processors, individually or collectively, are configured to execute the computer-executable instructions to further cause the relay device to:
receive a request for the relay characteristic report based on the relay capability indication,
wherein the relay characteristic report is transmitted based on the request for the relay characteristic report.

* * * * *